Feb. 5, 1957  L. R. WOSIKA ET AL  2,780,174
PUMP AND POWER PLANT ASSEMBLY
Filed March 19, 1951  11 Sheets-Sheet 3

INVENTORS
LEON R. WOSIKA
ARSHAM D. ZAKARIAN
BY Strauch, Nolan & Diggins
ATTORNEYS Feb. 5, 1957  L. R. WOSIKA ET AL  2,780,174
PUMP AND POWER PLANT ASSEMBLY
Filed March 19, 1951  11 Sheets-Sheet 5
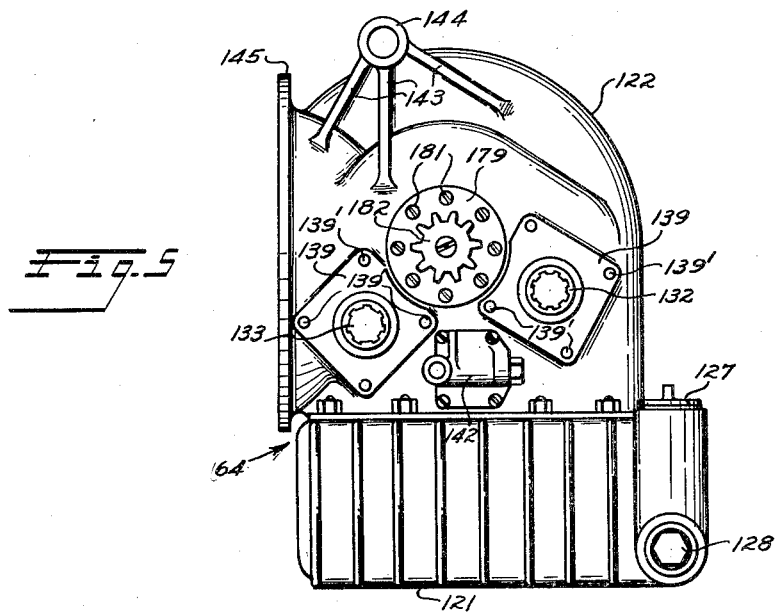
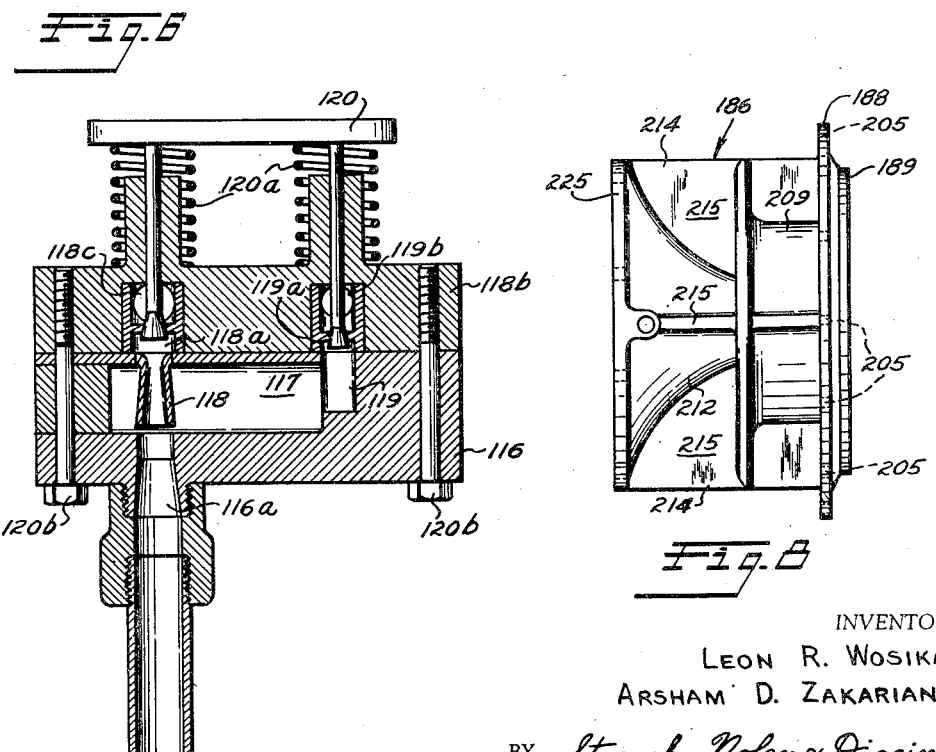
INVENTORS
LEON R. WOSIKA
ARSHAM D. ZAKARIAN
BY *Strauch, Nolan & Diggins*
ATTORNEYS

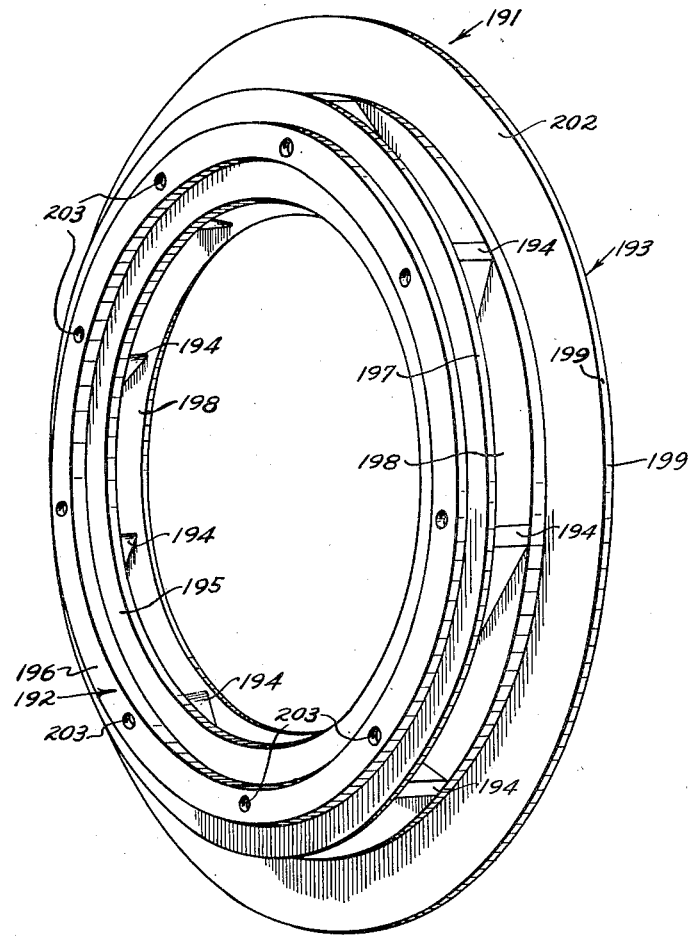

Feb. 5, 1957  L. R. WOSIKA ET AL  2,780,174
PUMP AND POWER PLANT ASSEMBLY
Filed March 19, 1951  11 Sheets-Sheet 7

INVENTORS
LEON R. WOSIKA
ARSHAM D. ZAKARIAN
BY Strauch, Nolan + Diggins
ATTORNEYS

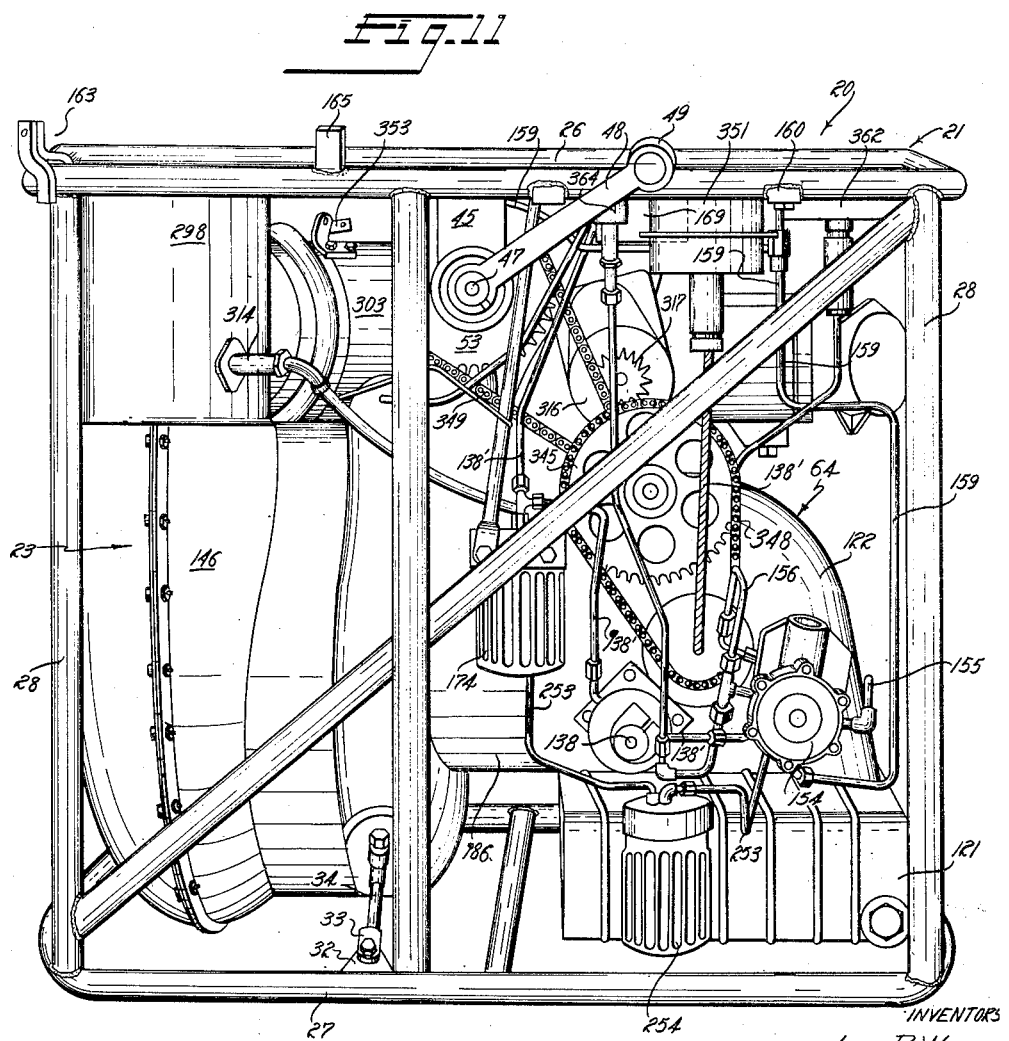

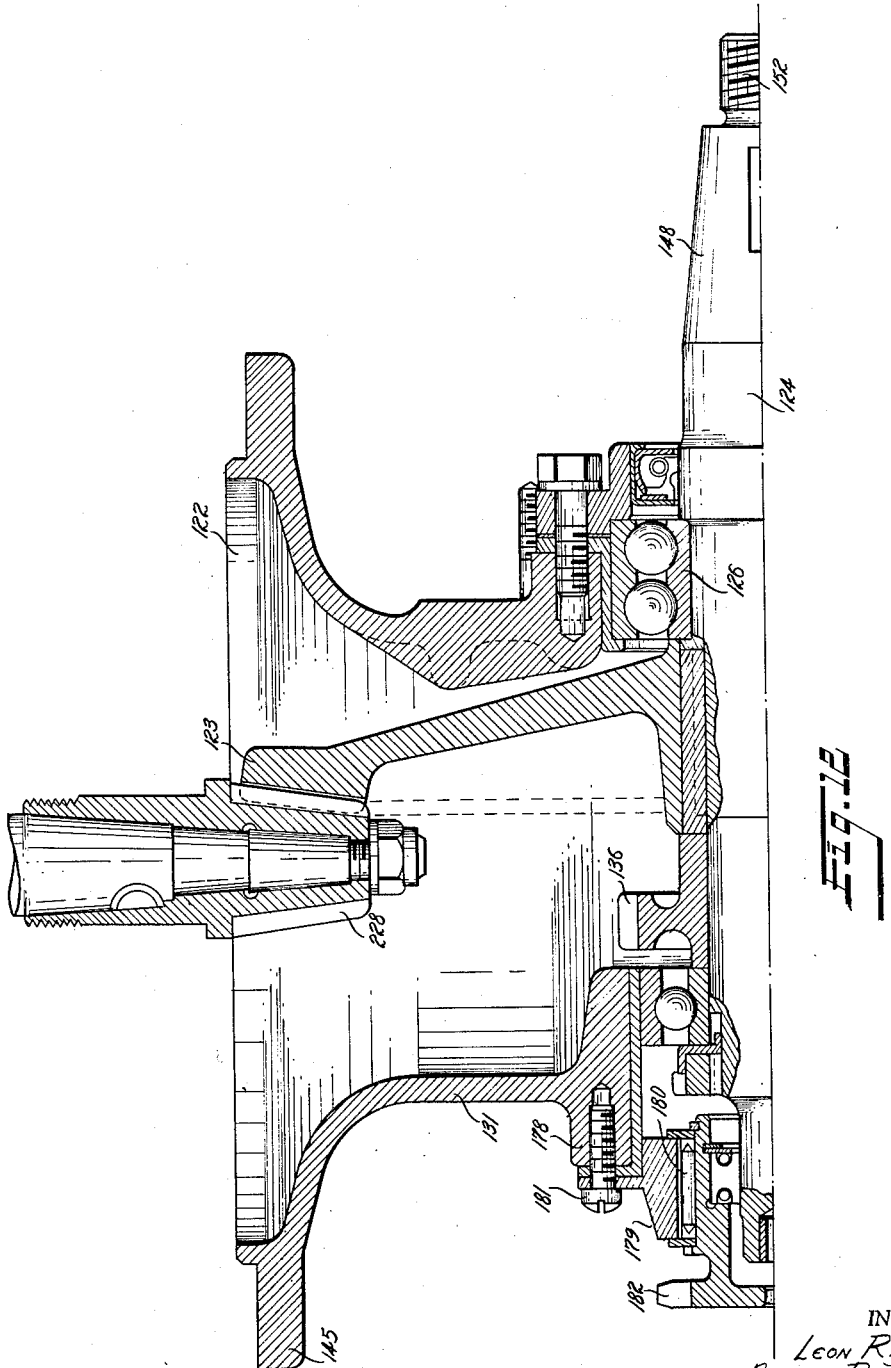

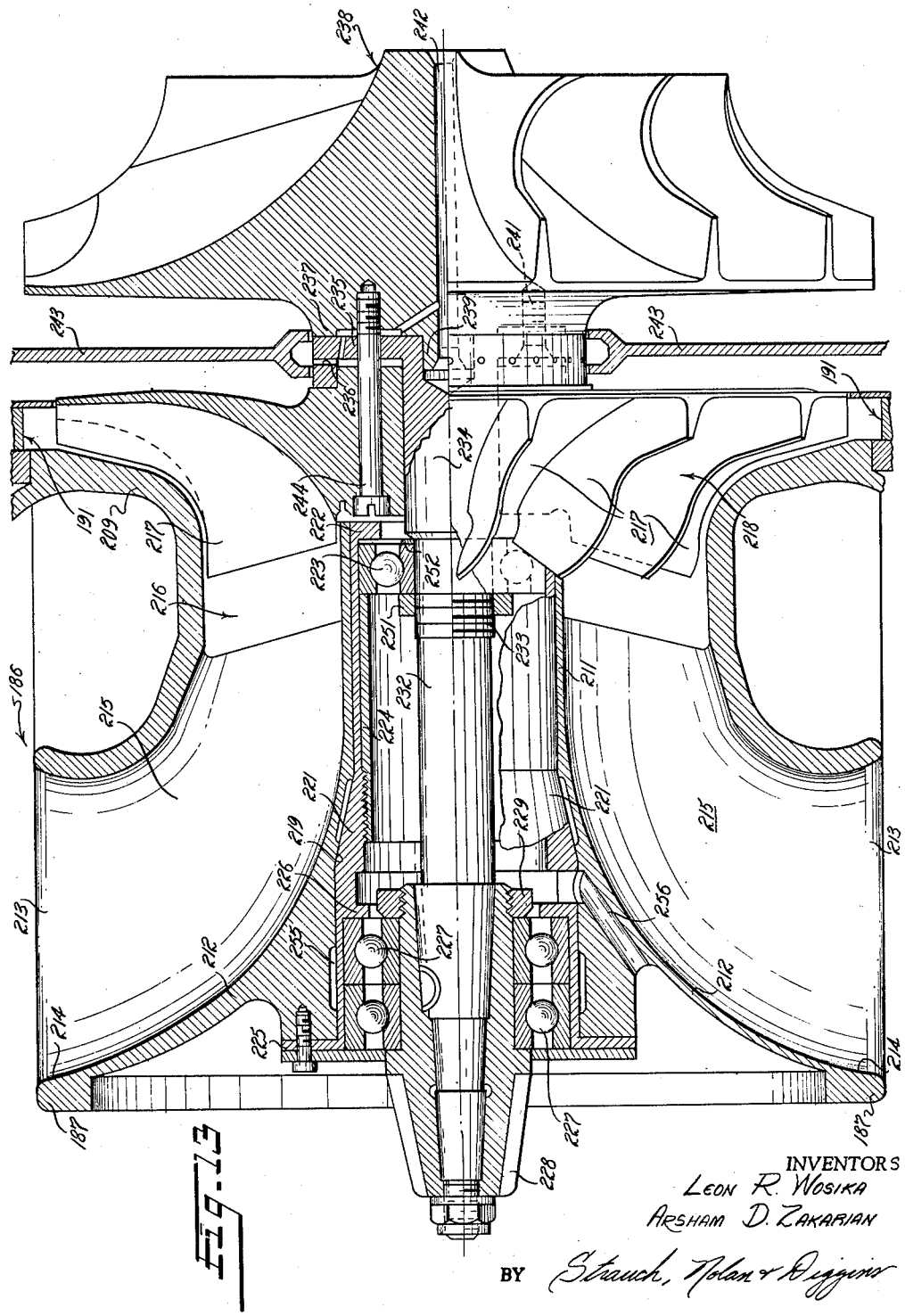

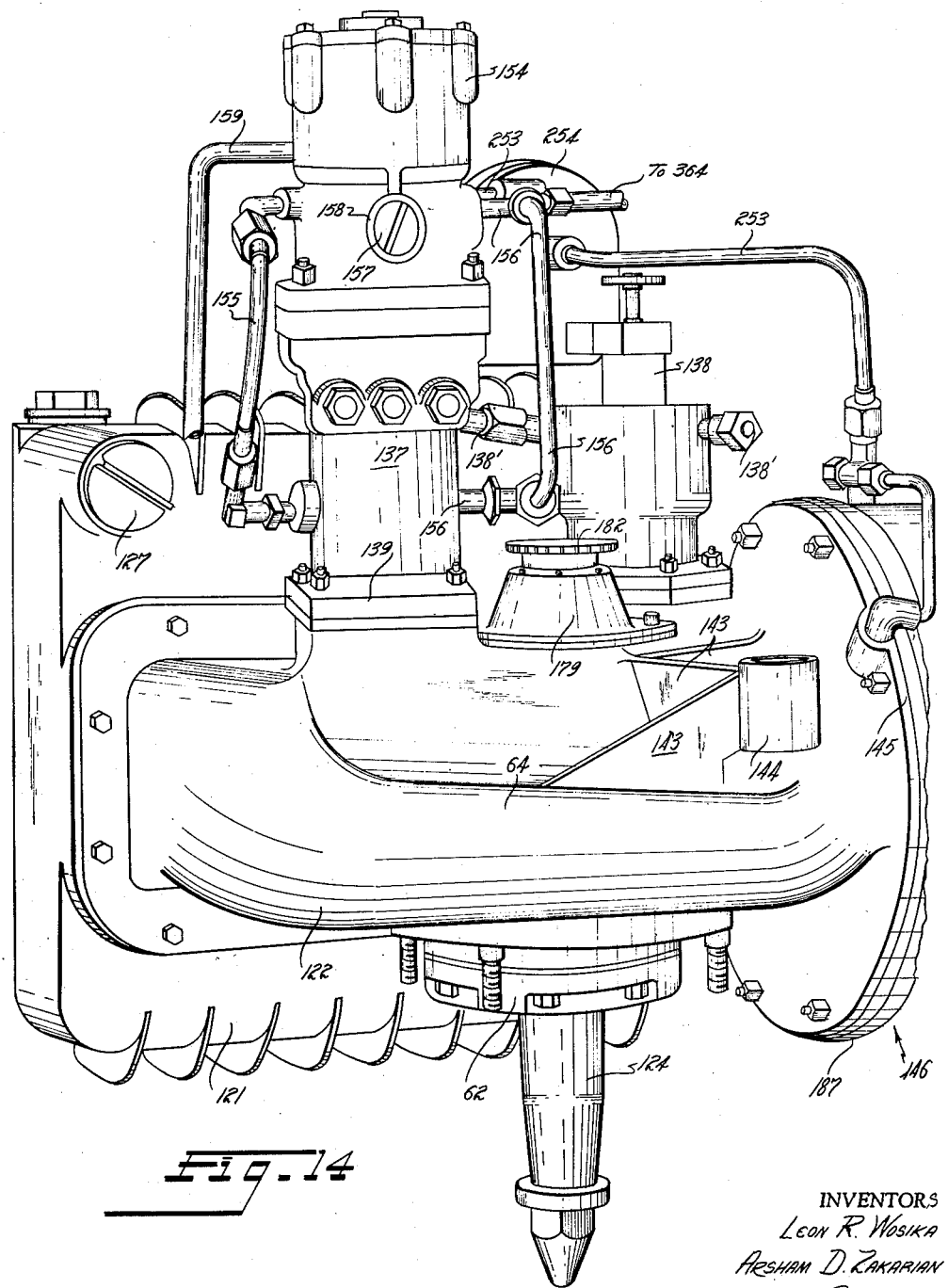

United States Patent Office 2,780,174
Patented Feb. 5, 1957

2,780,174

PUMP AND POWER PLANT ASSEMBLY

Leon R. Wosika, San Diego, and Arsham D. Zakarian, Del Mar, Calif., assignors to Solar Aircraft Company, San Diego, Calif., a corporation of California Application March 19, 1951, Serial No. 216,282

35 Claims. (Cl. 103—87)

The present invention relates to a novel self-contained power pump unit and a novel power plant assembly therefor. More particularly the present invention relates to a portable self-contained fire pump and power plant assembly of compact, light weight, construction particularly designed for use aboard ship or in other confined places where self-contained power pump units may be desirable.

At the present time in the fighting of fires occurring in areas remote from a source of water under pressure, extinguishment of the fires has been extremely difficult, if not impossible because of the inability to move the pump equipment into a suitable, convenient area and the lack of adequately powered portable pump units for producing an extinguishing stream of liquid. It is customary to provide pump units adapted to be mounted upon fire trucks and like fire fighting apparatus to be driven by the power units of such trucks and apparatus and, in the case of ships, to provide pump units operable from the power sources available for driving the ships and the auxiliary equipment employed aboard ship. There are also portable powered units of the general type known in the United States Navy as the "Handy Billy" capable of delivering liquid at the rate of about sixty gallons per minute and the Model P–500 I. E. C. pump employing gasoline fueled internal combustion engines.

The prior art "Handy Billy," so far as applicants are aware, does not provide a portable power pump unit capable of performing the desired functions of delivering an adequate volume of liquid, namely, 500 gallons per minute at 100 lbs. per square inch pressure at a static lift of 16 feet and 600 gallons per minute at 65 lbs. square inch pressure at a static lift of 16 feet, requires highly combustible gasoline as a fuel introducing an additional fire hazard as a result, particularly on oil tankers and other ships where a gasoline supply must be provided solely for use in such pump units introducing a serious logistics problem, in use has the proverbial starting problems of the well known outboard motors, and produces large volumes of noxious CO gas, which due to the characteristics of internal combustion engines, cannot be satisfactorily removed to permit location of the pump unit in closed areas, such as ship compartments below deck, for use.

The Model P–500 I. E. G. pump units on the other hand are unduly heavy and cumbersome militating against their satisfactory use as portable units, and also have the fire hazard, noxious CO fumes, and logistics problems mentioned in connection with the "Handy Billy" unit.

As a consequence and because of the Navy's inability during the past war to secure adequate and satisfactory pumps to practice certain of its essential fire extinguishing methods, such as foam extinguishing methods, when the ship's power plant was disabled, the United States Navy requested manufacturers to attempt to provide a satisfactory portable self-contained power pump unit capable of satisfactory all around use on shipboard in cases where the power mechanism aboard ships for one reason or another could not be relied upon as the pump power source. In this connection, it was specified that the pump power unit should be so constructed that it could be readily carried from place to place through hatch covers and various passages of extremely small dimensions.

It is, therefore, the primary object of the present invention to provide a self contained power pump unit of extremely compact design and light weight, adapting it for portable usage, and convenient handling through hatches and up and down companionway stairs, ship ladders, etc., while providing a sufficient output capacity to deliver an adequate stream or streams of water for fire extinguishing, among other purposes, without the fire hazard and CO gas discharge problems of the prior pump units.

It is another object of the present invention to provide a novel and a compact compressor turbine power plant unit of high horsepower to weight ratio adapted for usage as a power source with any fuel from diesel fuel to high test gasoline on any type of sea craft or on shore thereby eliminating all substantial logistics problems and providing a unit that can be brought much closer to a fire to lessen hose requirements and manpower for operation.

A more specific object of the present invention resides in the provision of a self-contained turbo-compressor power pump unit having a skeleton tubular supporting framework of relatively small over-all dimensions and designing the pump and power plant units to be housed within the peripheral limits of the framework.

Still another object of the present invention resides in the provision of a compressor turbine assembly and power plant unit in which the compressor scroll, the turbine scroll, and the combustion chamber are disposed in back-to-back surrounding relation to a combined compressor and turbine rotor assembly.

A further object of the present invention resides in arranging a centrifugal pump unit and compressor turbine power plant unit with their respective shaft axes at right angles to minimize the over-all length and width of the resulting unit and provide a self-contained power pump unit of extremely compact nature.

Still another object of the present invention resides in the provision of a compresser turbine power plant unit in which the compressor unit and the turbine unit are mounted in back-to-back relation with their respective scroll structures in surrounding relation to a combined compressor turbine rotor assembly, and the combustion chamber is mounted upon the compressor scroll outlet conduit and the turbine scroll inlet conduit and shaped to lie substantially in the space formed between the respective ends of the compressor scroll outlet conduit and the turbine scroll inlet conduit.

Another object of the present invention resides in providing a combined compressor turbine rotor wherein the compressor wheel and the turbine wheel are mounted in back-to-back axially spaced relation with a radiation shield arranged between the respective wheels and adapted to shield the compressor wheel from the heat radiating from the turbine wheel.

Still another object of the present invention resides in providing a compressor turbine power plant unit with a compressor housing having a coaxially arranged, axially extending, annular compressor inlet conduit and a centrally disposed coaxial through bore adapted to journal and support the compressor turbine power shaft and its associated compressor turbine wheels in axially fixed relation with respect to the compressor housing.

A further object of the present invention resides in providing a compressor housing having a coaxially arranged, axially extending annular compressor inlet conduit provided with a through bore to journal and support the compressor turbine power shaft and associated turbine wheels against relative axial movement with a compressor outlet scroll mounting flange at the end adjacent the compressor wheel and a support flange at the other end for mounting the compressor housing and its supported structure on the housing of a gear box unit to be driven to thereby form a unit power plant assembly.

Another object of the present invention resides in the provision of a compressor turbine assembly having a side entry combustion chamber tightly wrapped around a close-coupled radial flow compressor turbine assembly.

Still another object of the present invention resides in providing a novel riveted nozzle vane assembly for a radial flow turbine.

A further object of the present invention resides in providing a back-to-back compressor turbine structure with novel air leakage, sealing, and heat radiation structure for protecting the compressor.

Another object of the present invention resides in the provision of novel means for connecting the compressor turbine housings of a back-to-back compressor turbine assembly.

A further object of the present invention resides in the provision of a novel riveted entry nozzle vane assembly for a turbine constructed so one end serves as a portion of the turbine rotor housing and passage and the other end serves as a portion of the turbine intake scroll.

A further object is to provide an extremely reliable starting means, which will function without failure under adverse conditions, even in sub-zero weather, with a minimum of manual effort and driving connections between the starting means and turbine shaft whereby the starting speed of the turbine shaft and the turbine rotor is rapidly attained thereby eliminating starting failures prevalent in prior units provided for similar service and assuring prompt operation at full capacity for fire fighting use where time is the essence of success.

An additional object of the invention is to provide a novel gear box having a power take-off shaft for operating a pump or other apparatus drivingly coupled with the turbine shaft, and manually operable speed multiplying starting means drivingly connected with the power take-off shaft by an overrunning one way clutch device.

Further objects will appear as the description continues in connection with the appended claims and the attached drawings wherein:

Figure 5 is a side elevational view of the gear of box of Figures 1 to 4;

Figure 6 is a transverse sectional view illustrating an ejector primer adapted for use in conjunction with the liquid pump unit forming a part of this invention.

Figure 7 is a detailed view of the compressor diffuser structure forming a part of the present invention;

Figure 8 is a detailed elevational view of the air inlet body casting of the turbo compressor power element;

Figure 11 is a side elevational view of the power pump unit of Figure 1 viewed from the side opposite Figure 2;

Figure 12 is a fragmental sectional view taken substantially on the center line of the pump drive shaft looking downwardly and illustrating the drive connection with the turbine shaft and the details of the one-way clutch forming a part of the starting mechanism;

Figure 13 is an enlarged fragmental sectional view illustrating the back-to-back compressor turbine rotor unit and its mounting in the compressor housing; and Figure 14 is a pictorial view, with certain parts omitted, looking downwardly on the gear box housing and showing the general location of the fuel and oil lines and the fuel control elements mounted thereon.

*General assembly and framework*

Figure 1:
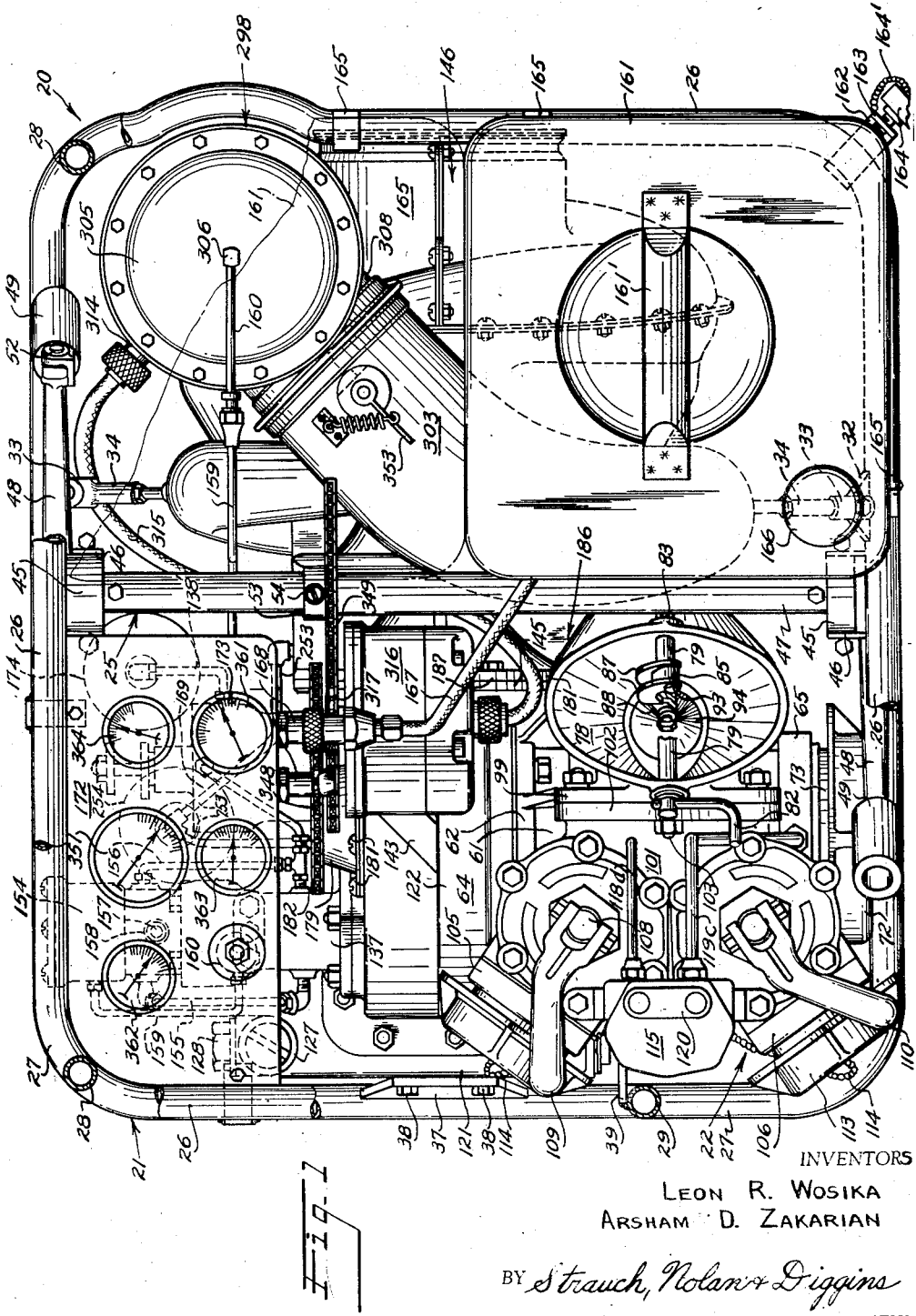
Figure 1 is a top plan view of a power pump unit made in accordance with the present invention.

With continued reference to the drawings wherein like reference numerals are used throughout to indicate the same parts, the power pump unit of this invention is generally indicated by the reference numeral 20. Power pump unit 20 comprises a skeleton tubular framework 21, a pump unit 22, a power plant unit 23, a pump primer unit 24, and a starting crank mechanism 25. The skeleton framework and each of these units is of extremely compact design and relatively small dimensions and arranged so the various units making up the power pump unit will occupy the space within the overall dimensions of the framework and provide a power pump unit 20 that may be conveniently moved from place to place through shipboard doorways, passages, hatchways and the like of conventional dimensions. This compact arrangement and small dimensional feature is of extreme importance since one of the primary uses of the power pump unit is intended to be upon shipboard to combat fires below deck and in the hold, powder magazines, storage spaces, passage ways where it is difficult to gain access to adequate power for water under pressure from conventional or standby sources in the event the primary power plant is out of commission or otherwise disabled or the ship's fire lines are severed.

With this basic consideration in mind, framework 21 of power pump unit 20 of this invention comprises substantially rectangular upper and lower frame elements 26 and 27 composed of tubular piping formed to provide overall dimensions slightly less than 24 by 30 inches, the usual dimensions of shipboard hatch covers, so power pump unit 20 might be taken to any portion of the ship where it might be needed. These upper and lower frame elements 26 and 27 adjacent the three corners are connected by vertically extending tubular or pipe framing elements 28 the opposite ends of which are respectively welded to frame elements 26 and 27. In the corner where the pump unit 22 is located, the corner vertical frame element is omitted and a vertically extending tubular or pipe frame element 29 (Figures 1 and 3) offset from the corner is provided. As clearly seen in Figure 1, the respective four corners of the rectangular frame elements 26 and 27 are curved to avoid sharp corners which might interfere with the passage of the pump power unit 20 through a narrow doorway or similar opening. While suitable diagonally and transversely arranged tubular or pipe frame elements may be provided between upper and lower frame elements 26 and 27 or between the vertically extending frame elements 28 and 29 to reinforce the framework; the present disclosure does not illustrate such reinforcing struts.

Figure 4:
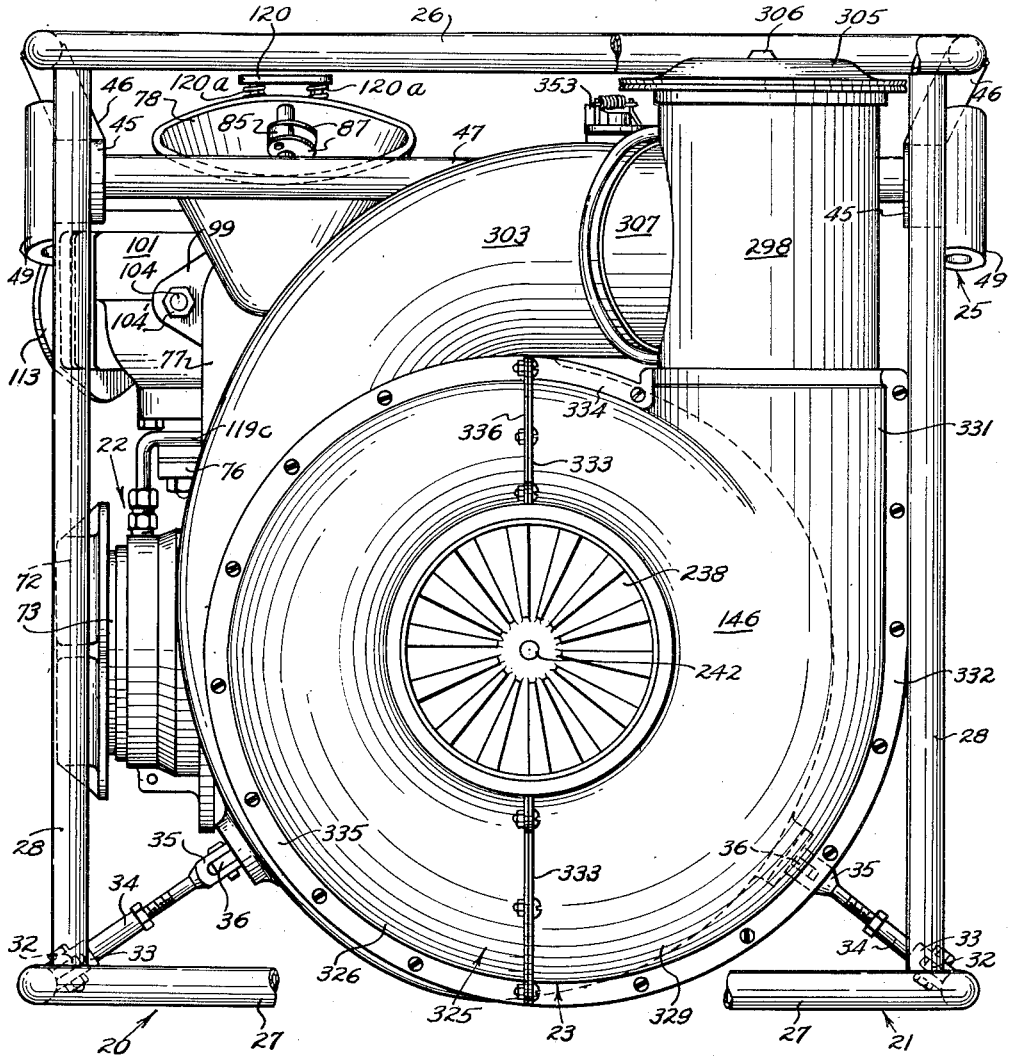
Figure 4 is an end elevation showing primarily the power turbine unit of Figure 2 looking toward the right end of Figure 2.

Referring for the moment to Figures 1 and 4, the longer sides of the lower frame element 27 adjacent the power element end are provided with inwardly and upwardly directed, opposed securing ears 32 adapted to receive the respective bifurcated ends 33 of opposed upwardly and inwardly directed, axially adjustable, mounting rods 34, the upper ends of which are provided with bifurcated portions 35 adapted to receive mounting ears 36 provided on the power element of unit 23. The end member of frame element 27 at the end bearing pump unit 22 and approximately mid way of its length is provided with a vertically extending ear 37 which serves as a mounting support for the opposite end of the power plant unit 23 which is secured thereto by cap screws 38 threaded into the gear box of power plant unit 23. The vertically extending frame element 29 at a point suitably spaced above frame element 27 is provided with a vertically and inwardly extending supporting plate 39 which is welded to element 29 and is adapted to be secured to pump unit 20 in a manner to be presently pointed out.

Frame element 26 is provided with transversely extending journal bosses 45 suspended from mounting plates or ears 46 welded to frame element 26 and disposed in opposed relation between pump unit 22 and the power source or power plant unit 23 for journalling the crank shaft 47 of the starter crank mechanism 25. As clearly seen in Figures 1 and 3, crank shaft 47 terminates at its opposite ends within the confines of frame elements 26 and 27 and is provided with suitable crank arms 48 terminating in crank handles 49 pivotally mounted at 52 at the free end of crank arms 48 so as to be moved to inoperative position within the confines of the frame members. At a suitable point between its ends crankshaft 47 is provided with a 32 tooth sprocket wheel 53 non-rotatably mounted on shaft 47 by set screws 54 threaded through the hub of sprocket wheel 53. Sprocket wheel 53 constitutes a part of the starting crank mechanism, the details and operation of which will be more fully described hereinafter.

As clearly seen from the description thus far given, the skeleton framework completely surrounds the various units and determines the overall dimensions of the power pump unit 20 of this invention. It will, furthermore, be noted from an inspection of Figures 1 to 3 that power plant unit 23 has its driving and driven shafts mounted with their respective axes at right angles in such a way that unit 22 may be disposed in one corner of the skeleton framework with the crankshaft 47 of the starter crank mechanism lying substantially in a plane paralleling the axis of pump unit 22. This construction assures an assembly of minimum longitudinal dimensions yet, due to the general configuration of the pump unit 22 and the power plant unit 23, provides ample free space within the framework for the various accessory mechanisms necessarily provided in connection with each.

*Pump unit*

Figure 2:
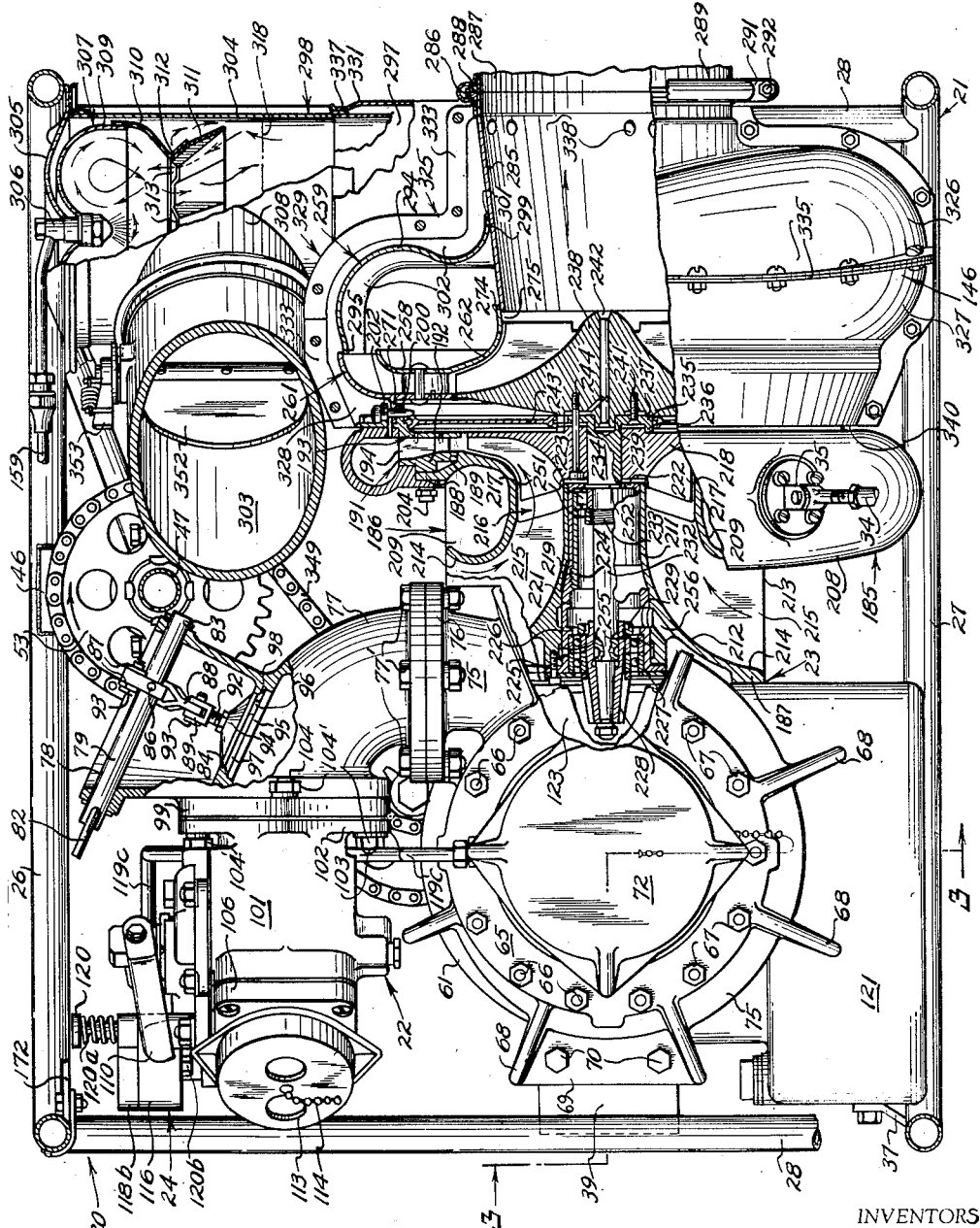
Figure 2 is a side elevational view with certain parts in section to illustrate the construction of the combined compressor turbine rotor and combined compressor turbine housing and scroll structure.
Figure 3:
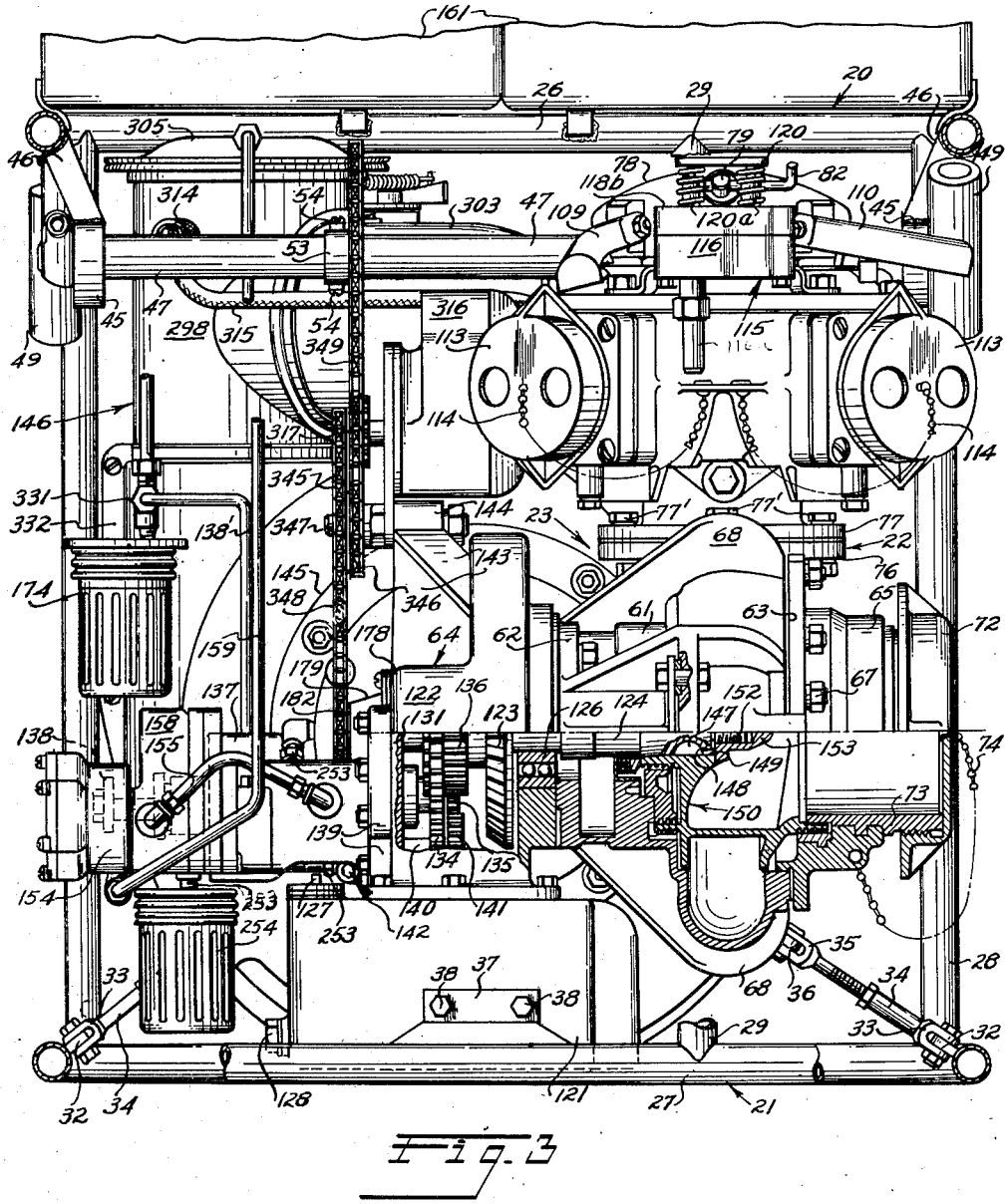
Figure 3 is an end elevation of the power pump unit of Figure 2 looking toward the left end of Figure 2 with certain of the parts in section to illustrate the construction of the pump rotor and the interior of the gear box.

Referring for the moment particularly to Figures 1, 2 and 3, pump unit 22 is depicted as a centrifugal water pump and comprises a scroll-type circular pump housing or body 61 the opposite longitudinal ends 62 and 63 of which are flanged and respectively connected to a gear box unit 64, forming a part of the power element of unit 23 and a pump head 65 by means of stud and nut assemblies 66 and 67 respectively. As clearly seen in Figure 2, pump body 61 is provided with radially extending reinforcing ribs 68 and the two ribs adjacent support plate 39 are connected by a web 69 apertured in alignment with suitable apertures in plate 39 to receive mounting bolt and nut assemblies 70. The outer end of pump head 65 receives a cap member 72, screw threadedly engaged with a four inch threaded pipe inlet insert 73 to guard the inlet threads from mutilation, secured against accidental misplacement by means of a securing chain 74. Pipe insert 73, through its threads, is adapted to be coupled to a suitable inlet hose structure which may be connected to any suitable source of water or other fire extinguishing medium. It will be appreciated that for shipboard use the inlet end of the hose may be deposited in the sea so as to draw sea water from the body of water in which the ship floats.

Pump body 61 intermediate its ends is provided with a tangentially arranged outlet conduit 75 the upper end of which is flanged at 76 and supports an elbow primer 77, nut and bolt assemblies 77' being provided for connecting elbow primer 77 to flange 76.

As most clearly seen in Figure 2, elbow primer 77 is provided with a valved inlet conduit 78 having a generally tubular configuration extending outwardly from the outer wall surface of the elbow and provided with transversely opposed, aligned bores providing journal openings for a valve actuating shaft 79. Shaft 79 at its uppermost end is provided with an operating handle 82 and at its lower end with a cotter pin 83, handle 82 and pin 83 being adapted to position shaft 79 against axial movement with respect to the journal openings provided in conduit 78. Intermediate its ends and centered with respect to an inlet passage 84 provided in the wall of elbow 77, shaft 79 is provided with a lever arm 85 held in place by a suitable set screw 86. Arm 85 is adapted to be pivotally received between the bifurcated ends 87 of a valve actuating lever 88 pivotally connected at its opposite end to bifurcated end 89 of a valve rod 92, the pivotal connections being made through pivot pins 93. Valve rod 92 is threadedly received in the domed face of a valve body 94 provided to seal inlet passage 84 upon actuation of handle 82 in a clockwise direction to move valve body 94 toward the open end of conduit 78.

As clearly seen in Figure 2, valve body 94 has an enlarged flange portion 95 separated from the domed face by an annular groove 96 containing a sealing ring 97 of suitable material adapted to sealingly engage sloping wall 98 of passage 84 when crank 82 is actuated to draw rod 92 outwardly. Due to this outward sealing movement of valve body 94, it will be appreciated that when pump unit 22 is normally operating the fluid pressure in elbow 77 will tend to sealingly engage valve 94 with primer passage 84 and prevent outward flow of fluid through primer conduit 78. The upper flanged end 99 of elbow 77 is adapted to support a pump discharge structure 101 having a four inch inlet port open to the primer elbow and provided with a mounting flange 102. To this end, end flange 99 is provided with a pair of diametrically opposed studs 103 and flange 102 is provided with a pair of similar mounting studs 104 diametrically opposed and arranged in a plane at right angles to the plane of studs 103. Suitable securing nuts 104' co-operating with studs 103 and 104 serve to secure the pump discharge structure 101 to flange 99.

Pump discharge structure 101 as seen in Figure 1, is of general Y-shape configuration to provide diverging two and one-half inch outlet conduits 105 and 106 the flow through each of which is controlled by respective ball type valve structures (not shown) carried by valve shafts 108 adapted to be respectively actuated by valve actuators 109 and 110. Discharge conduits 105 and 106 are each provided with an outlet pipe insert 112 adapted to threadedly receive a suitable cap 113 to prevent mutilation of the threads. Loss of caps 113 is prevented by means of chains 114 in a manner well known to the art.

Discharge conduits 105 and 106 have their outward ends threaded for the connection of standard fire hoses provided to play the stream of fire extinguishing liquid passing through unit 22 on the fire. It will be readily appreciated that either or both of discharge conduits 105 and 106 may be used as circumstances demand merely by removing the desired cap, connecting a suitable hose thereto, and actuating the desired valve actuating handle or handles. It will thus be apparent that the present invention provides a pump unit capable of supplying one or two fire hoses as may be desired and provides ready means for shutting down both or either as circumstances require. The impeller of pump unit 22 is mounted on the output shaft of power plant unit 23 in a manner to be hereinafter described in detail.

Ejector primer 24 is disposed on pump discharge structure 101 at a point between discharge conduits 105 and 106 and is shown in detail in Figure 6. Ejector primer 24 may be of any suitable construction. As shown in Figure 6, it comprises a unit supplied by the Hale Fire Pump Company of Conshohocken, Pennsylvania, and includes a body 116 having a venturi discharge passage 116a the inner throat end of which intersects an enlarged aspiration chamber 117 formed by drilling the body at right angles to the axis of passage 116a and inserting a plug in the outer end of the drilled hole. Chamber 117 in axial alignment with passage 116a is provided with a suitable aperture, adapted to rigidly mount a primary ejector nozzle 118 communicating through a valved passage 118a in a head member 118b with an inlet passage 118c connected through a suitable conduit 118d (Figure 1) with the outlet side of the compressor of the turbo-compressor power unit to be presently described.

Chamber 117 at one end directly communicates with an intersecting passage 119 leading to a valved passage 119a in head member 118b. Passage 119a connects with one end of an inlet passage 119b the other end of which is connected through a suitable conduit 119c (Figure 1) with the interior of pump body 61.

The control valves for passages 118a and 119a comprise a unitary cross-head and valve stem assembly 120 slidably supported in head 118b and normally biased to valve closing position by coil expansion springs 120a acting between head 118b and the cross-head of assembly 120. The ejector primer 115 is provided for use in place of elbow primer 77 particularly when a ready source of priming liquid is not available or when for some other reason use of elbow primer 77 is not desired. Suitable cap screws 120b are provided to secure body 116 and head 118b in assembled relation.

Operation of ejector primer 24 to evacuate pump 61 in well known manner is effected after the pump unit 20 is in operation by depressing assembly 120 against the resistance of springs 120a to open the valved passages 118a and 119a. This operation of assembly 120 results in a high velocity flow of air, created by the compressor of the turbo-compressor, through conduit 118d, passage 118c, valved passage 118a, nozzle 118, and venturi passage 116a. This high velocity air stream aspirates air from chamber 117 in well known manner and the aspirated air is immediately replaced by air from passages 119, 119a, 119b, conduit 119c and the air in pump body 61. Accordingly, if the inlet hose connected to pump inlet 73 is immersed in water and assembly 120 is held depressed for a suitable length of time, 45 seconds in practice having been found sufficient, the air in pump body 61 will be wholly replaced by water rising through the inlet hose. When thus filled with water, pump 61 is in condition for operation and pumping may be immediately started by opening one or both of the pump outlet conduits 105 and 106.

*Power plant unit*

Referring again to Figure 3, power plant unit 23 includes a gear box unit 64 having a rectangular box-like base or oil sump 121 and a gear box housing 122 mounted on sump 121 and housing a main drive bevel gear 123 non-rotatably mounted on a gear box take-off shaft 124 journalled in an internal bearing 126 suitably mounted in the pump end of the gear box. As clearly seen in Figures 3 and 5, oil sump 121 includes a filler opening closed by plug 127 and a drain opening closed by a magnetic plug 128 for collecting metal particles deposited in the oil. Suitable tapped openings are provided in the wall of sump 121 to receive mounting cap screws 38 heretofore described.

Wall 131 of gear box housing 122 at opposite sides of and in planes slightly below the plane of the axis of shaft 124 is provided with openings for internally splined auxiliary drive take-off shafts 132 and 133 journalled in suitable bearings (not shown) in housing wall 131. Shafts 132 and 133 are respectively non-rotatably connected to spur drive gears 134 and 135 adapted to meshingly engage with a common power take-off pinion 136 keyed to or otherwise non-rotatably carried by shaft 124. Auxiliary drive shafts 132 and 133 are provided to drive auxiliary equipment associated with the power plant unit such as a fuel pump 137 and an overspeed fuel shut-off valve 138 (Figures 1, 11 and 14) connected in the fuel line ahead of fuel pump 137 in pipe line 138' serving as the connection between the fuel manifold to be presently described and fuel pump 137. Fuel pump 137 is preferably of the gear type such as that obtainable on the market from the Pesco Products Division of Borg-Warner Corporation. Shut-off valve 138 may be of any conventional construction providing a normally open, sleeve valve whose movement is controlled by a spring-loaded valve plunger held in an inactive position by a flyweight assembly carried by a journalled shaft drivingly splined to shaft 133 and adapted to release the plunger when the turbine speed exceeds the preset safe speed. Since the details of shut-off valve 138 and fuel pump 137 form no part of the present invention a further detailed disclosure will be omitted here.

To adapt shafts 132 and 133 for driving fuel pump 137 and shut-off valve 138, the outer ends are internally splined (Figure 5) to provide sockets disposed in centered relation with respect to mounting bosses or pads 139 opening outwardly of wall 131 and provided with angularly spaced mounting studs 139'.

Gear box unit 64 in the plane of and below shaft 124 is provided with an oil pump drive shaft 140 journalled in housing wall 131 and provided with a drive gear 141 meshingly engaging drive gear 135. Shaft 140 through a suitable tongue-drive connection (not shown) drives a gear type oil pump 142 of any suitable and well known structure attached to housing wall 131 in any suitable manner. Oil pump 142 draws oil from sump 121 and discharges it through suitable connections, to be hereinafter described, to the turbine bearings and main bevel gear 123 and its drive pinion from whence the oil flows by gravity to ducts of any suitable character (not shown) surrounding bearing 126 of shaft 124, through bearing 126, and then over accessory gears 134, 135, 141 and the bearings of shafts 132, 133 and 140 and back to sump 121.

The upper part of housing 122 is provided with integral angularly spaced web members 143 terminating in a journal boss 144, the axis of which parallels the axis of shaft 124 for a purpose which will be hereinafter pointed out. As clearly seen in Figures 3, 5 and 12, housing 122 is provided with an annular mounting flange 145 adapted to co-operate with and provide a support for the power unit 146 to be presently described in detail.

Referring again to Figures 3 and 12, the pump end of shaft 124 is machined to receive a Woodruff key 147 and is suitably tapered as indicated at 148 to receive the correspondingly tapered bore 149 of pump impeller rotor 150. To this end, the end of shaft 124 within pump housing 61 is reduced in diameter and threaded as indicated at 152 to receive a dome shaped securing nut 153 provided to secure impeller 150 on tapered portion 148 of shaft 124 and retain the impeller in assembled relation thereon.

The outer end of fuel pump 137 supports a droop or proportional control governor 154 of conventional structures, for example an X742–09 governor produced by Woodward Governor Company of Rockford, Illinois, and containing a central drive sleeve or tube splined to the outer end of the fuel pump shaft, a spring loaded pilot valve plunger free to move inside the drive sleeve, a differential relief valve, an ultimate relief valve, a spring-held ball check valve, and drive shaft flyweights. Since the details of this governor are conventional and form no part of the present invention a more detailed description is not deemed necessary here. Governor 154 and fuel pump 137 are connected in series in the fuel line by means of conduit 155 (Figures 1, 3 and 14) and the governor is also connected into fuel line 138' ahead of fuel pump 137 through conduit 156 to provide a by-pass fuel line leading from the governor relief valves to the inlet side of fuel pump 137.

In actual operation, governor 154 rotates at a speed proportional to the turbine speed by reason of the drive connection through the fuel pump and the gears of gear box 64. Upon a reduction in load, whereupon the turbine will exceed its predetermined maximum speed, the speed of governor 154 will increase proportionately and the flyweights will move outwardly and through suitable connections move the pilot valve plunger toward its closed position thereby reducing fuel flow to the turbine nozzle. Simultaneously the by-pass flow of fuel through the governor relief valves is increased. As a consequence, the turbine speed will be automatically reduced in spite of the tendency of fuel pump 137 to supply more fuel. Underspeed of the turbine produces an opposite effect on governor 154 to increase the turbine speed. Suitable adjustment of governor 154 to predetermine the operating speed of the unit is effected through adjustment screw 157 (Figures 1 and 14) accessible from the exterior of governor 154 through the upwardly facing opening in boss 158 (Figures 1, 3 and 14) and adapted to vary the tension of the flyweight springs in well known manner. Governor 154 is also provided with a fuel outlet conduit 159 leading from its underside through a manual throttle valve 160 to be hereinafter more fully described to the combustion chamber.

Fuel for operating the pump unit 20, may be obtained from any suitable source. Preferably, however, two portable fuel tanks 161 of rectangular shape in cross-section (Figure 1), having a carrying handle 161' and at one lower corner a tapped lug 162, are provided for removable attachment to the upper frame member 26 as shown in Figure 1. To this end, the corners of frame member 26 adjacent the turbine end of framework 21 are provided with upstanding mounting lugs 163 apertured to freely receive the threaded shank of a securing thumbscrew 164 and the respective intersecting runs of member 26 in spaced relation to lugs 163 have suitable upstanding abutment lugs 165 welded thereto in opposed angular relation. Thumbscrews 164 are preferable secured against disassociation from framework 21 by suitable securing chains 164' the opposite ends of which are suitably secured to lugs 163 and thumbscrews 164.

Each tank 161 in practice is separately transported to the point of use of pump 20 and placed in position on the intersecting runs of frame member 26 with the tapped lugs 162 aligned with the respective mounting lugs 163. The respective pendant thumbscrews 164 are then inserted through apertured lugs 163 and threadedly engaged in the respective tapped lugs 162. Upon tightening the respective thumbscrews 164, the respective tank 161 will be drawn toward the respective corners until the bottom edges thereof tightly abut the opposed angularly related lugs 165. Thus tanks 161 are positively and quickly secured to pump unit 20 after the pump is located at the desired point of use.

Each tank is also provided with a respective filling opening (not shown) normally closed by a removable cap 166 (Figure 1) and an independent valve controlled fuel outlet, such as a petcock (not shown) connected to one end of conduit 167 leading from the lower portion of the tank. Each conduit 167 is adapted to be connected to one or the other of the two inlet fittings 168 provided by a fuel manifold 169 (Figure 1) mounted on the underside of a control and instrument panel 172 mounted in the corner of frame member 26 above fuel pump 137 and shut-off valve 138. As clearly seen in Figure 11, manifold 169 has a single outlet fitting 173 connected to pipe line 138' which is provided with a Purolator type P-1003 filter 174 manufactured by Purolator Products, Inc., Newark, New Jersey, and located in line 138' ahead of fuel shut-off valve 138.

This dual fuel tank arrangement and fuel manifold 169 permit alternate use of fuel tanks 161 so that the respective tanks 161 may be alternately removed for refilling, when empty, without interrupting continuous operation of pump 20.

The end of shaft 124 opposite that upon which pump impeller 150 is mounted extends through housing wall 131 with its axis lying in a vertical plane approximately midway between shafts 134 and 135 and slightly above the axis of shaft 132. Housing wall 131 in surrounding relation to the adjacent end of shaft 124 is provided with a mounting boss 178 of generally circular configuration. An annularly flanged generally conical cap member 179 is mounted on boss 178 by means of securing screws 181. Cap member 179 houses a shaft journal bearing 180 (Figure 12) and a suitable one way clutch 181', such as a sprag clutch, the outer element of which provides a hub mounting for a ten tooth sprocket wheel 182 forming a part of the starting crank mechanism 25 to be presently described. The one way clutch provided at this point may take any suitable form so long as it releases the driving connection between shaft 124 and sprocket wheel 182 when the forward speed of shaft 124 exceeds the forward speed of sprocket wheel 182.

Turning now to the turbo compressor power element of the power plant unit 23, the present invention contemplates a radial flow compressor 185 (Figures 2 and 13) having an axially extending hollow, air inlet body casting 186 providing a mounting flange 187 adapted to matingly engage mounting flange 145 of gear box 64. Body casting 186 adjacent its opposite end is provided with an annular mounting flange 188 (Figures 2 and 13) and a right angularly disposed axially extending, annular mounting shoulder 189. The shoulder 189 and the adjacent radial wall of flange 188 are adapted to support the compressor diffuser vane structure 191 shown in detail in Figure 7.

As clearly seen in Figure 7, diffuser vane structure 191 comprises a pair of plate-like rings 192 and 193 maintained in axially spaced relation by annularly curved vanes 194 welded to the adjacent faces of the rings 192 and 193 and preferably located angularly by positioning pins 194' (Figure 10) carried by ring 193 and extending into suitable openings in vanes 194. Ring 192 provides an inwardly directed flange portion 195 adapted to seat on shoulder 189, an axially extending annular body portion 196 the radially extending exposed wall of which is adapted to abuttingly engage the aforesaid adjacent wall of flange 188, and an outwardly extending annular flange 197 the opposite radial walls of which are respectively offset inwardly from the abutment wall of body portion 196 and the oppositely facing wall of flange portion 195. As seen in Figure 2, the inner face of ring 192 to which vanes 194 are welded comprises offset radial portions along its inner and outer marginal edges and a sloping intermediate connecting wall portion. The abutting edges of vanes 194 are similarly shaped.

Figure 10:
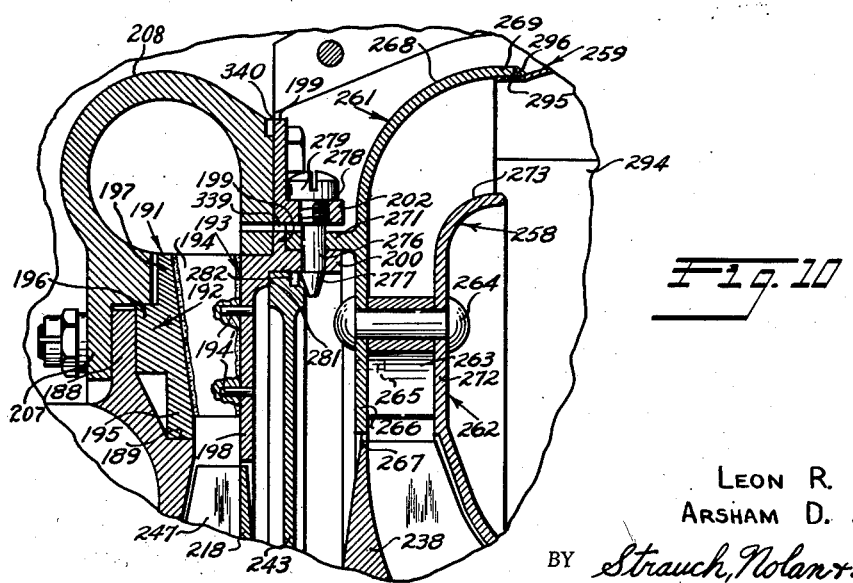
Figure 10 is an enlarged fragmental sectional view illustrating the novel assembly of the compressor diffuser, compressor scroll, the radiation shield, the turbine nozzle vane assembly, and the turbine scroll.

Referring to Figure 10, ring member 193 is slightly wider than ring 192, has a substantially radially extending body portion 198 to which the opposite edges of vanes 194 are welded, and a stepped back, peripherally disposed, annular flange 199. Extending from the face thereof opposite that to which vanes 194 are welded, flange 199, at a point slightly spaced outwardly from the periphery of body 198, is provided with an axially extending flange 200. Radially outwardly spaced from flange 200 is a second axially extending flange 202 the purpose of which will be presently pointed out.

As clearly seen in Figure 7, body portion 196 of ring 192 is provided with angularly spaced, axially directed, tapped openings 203 adapted to receive stud and nut assemblies 204 (Figure 2) the studs of which extend through mating openings 205 (Figure 8) in flange 188 of casting 186 and similar openings (not shown) in support flange 207 (Figure 10) of the compressor outlet scroll 208. As a consequence, it will be appreciated that diffuser vane structure 191 and compressor outlet scroll 208 are primarily mounted on body casting 186 in radially surrounding relation to the impeller end thereof.

Body casting 186 in concentrically spaced relation to its relatively short, dished, peripheral wall 209 provides a tubular bearing section 211 having an integral, annular, outwardly curving web 212 merging into flange 187. At angularly spaced intervals, integral radially directed, axially curved webs 213 are provided to rigidly connect peripheral wall 209 and bearing section 211 and form a substantially annular, axially extending air passage structure formed of relatively wide, peripherally disposed, inlet end portions 214, radially and axially curving passage ways 215 terminating adjacent the inner forward ends of webs 213 in a ring shaped air chamber 216. The opposite end of chamber 216 is adapted to freely receive the inner ends of outwardly and axially curving impeller vanes 217 the outer ends of which are disposed in radial alignment with the radial air passages through diffuser vane structure 191. As clearly illustrated in Figure 13, impeller vanes 217 form an integral part of a radial flow compressor impeller wheel 218 which is formed and mounted on the turbine output shaft in a manner to be presently described.

Referring for the moment again to bearing section 211 and Figure 13, it will be noted that the bore of bearing section 211 is of smaller diameter at the end adjacent impeller wheel 218 and that the smaller and larger diameter sections approximately midway of the length of section 211 are connected by a relieved, sloping wall portion 219. This construction provides definitely separated, offset, axially extending seating surfaces free of any definite intermediate annular shoulder requiring carefully machined tolerances on the respective snugly engaging, mating external seating surfaces of bearing sleeve 221 adapted to be mounted in bearing section 211. As clearly shown in Figure 13, sleeve 221 at the impeller end is provided with an inwardly directed annular flange 222 adapted to abuttingly engage the outer race of a suitable roller bearing 223 and an internally threaded portion located opposite sloping wall 219. This threaded portion is adapted to threadedly engage a bearing retainer sleeve 224 adapted to clamp the outer race of bearing 223 against flange 222 and secure bearing 223 in place within the end of sleeve 221. Sleeve 221 at its opposite end is provided with an outwardly directed annular flange 225 adapted to overlie and abuttingly engage the adjacent radial face of bearing section 211. The abutting engagement of flange 225 and the radial face of bearing section 211 determine the axial location of bearing 223 with respect to bearing section 211 and provides ready means for adjusting the axial clearance between impeller vanes 217 and wall 209 of body casting 186 as will be presently pointed out.

Bearing sleeve 221 adjacent the flange 225 and internally of the sleeve is provided with a bearing seat the inner end of which is determined by an inwardly directed annular flange 226. The outer races of a double roller bearing 227 mounted on the hub of turbine output, bevel pinion 228 by means of clamp nut 229 are adapted to be mounted in this bearing seat in abutting relation to flange 226. Bevel pinion 228 which drivingly meshes with bevel gear 123 is adapted to receive the turbine output shaft and combined compressor turbine rotor assembly now to be described and for assembly purposes it and its bearing 227 are preferably assembled and inserted as a unit in the end of bearing section 211 after the turbine output shaft is mounted in section 211.

As heretofore pointed out compressor impeller wheel 218 is mounted on the turbine output shaft denoted generally by numeral 232. Shaft 232, as seen in Figure 13, comprises a main body section one end of which is determined by a threaded section 233 of slightly greater diameter. Immediately adjacent section 233 is a bearing seat portion adapted to receive the inner race of bearing 223. At its end opposite section 233, the bearing seat portion intersects a radially extending shoulder formed by an annular end section 234 of increased diameter terminating in a relatively large diameter radially extending flange 235. The face of flange 235 intersecting the surface of end section 234 is annularly recessed to provide an axially extending shoulder 236 lying in radially spaced relation to the surface of section 234. This shoulder provides an abutment surface for the hub of compressor wheel 218 and the portion of the opposite face of flange 235 directly opposite shoulder 236 forms an abutment surface for the annular, axially extending rib 237 formed on turbine wheel 238.

The end of section 234 is provided with a coaxial counterbore adapted to snugly receive a piloting hub 239 formed on wheel 238 and terminating in the plane of the abutment face of rib 237. The annular recess of flange 235 at equal angularly spaced points is intersected by through bores, alternate ones of which are countersunk to freely receive cap screws 241 threadedly engaged in suitably tapped openings in the hub of wheel 238. Upon tightening of screws 241, wheel 238 is drawn toward flange 235 until the abutment face of rib 237 and the hub area immediately surrounding piloting hub 239 of wheel 238 clampingly engage the opposed faces of flange 235. This rigidly secures wheel 238 to the end of shaft 232 and provides an annular closed chamber defined by shoulder 237, the hub area surrounding piloting hub 239 and the opposed faces of flange 235 and the hub of wheel 238. This chamber is intersected by annularly spaced, sloping passages leading to a central through bore 242 formed along the axis of the hub of wheel 238 and by axially extending through passages formed in flange 235 at the outer periphery of the annular recess to establish communication between the latter recess and the closed chamber just described. The shoulder 236 is also provided with radially extending passages placing the annular recess in communication with the peripheral surface of flange 236 for a purpose to be presently pointed out.

With shaft 232 and wheel 238 assembled as just described, a generally ring shaped radiation shield 243 having inner and outer peripherally extending, annularly grooved, thickened portions is telescoped over shaft 232 and flange 236. The central bore in the inner thickened portion is dimensioned so as to have a running clearance with flange 236 and, due to the inwardly facing annular groove, forms a labyrinth seal effective to prevent fluid circulation from one side to the other of shield 243.

Wheel 218 is telescoped over the shaft 232 and assembled with respect to section 234 and flange 236 so that the countersunk through bores provided in its hub will be in axial alignment with the alternate aligned bores and tapped openings respectively of flange 235 and the hub of wheel 238. With the parts so assembled, the elongated cap screws 244 are inserted and screwed home securing wheel 218 in rigid assembled relation with shaft 232 and wheel 238. The protruding portion of shaft 232 is then readily insertable into and through the bore of bearing 223, securing nut 251 being threadedly associated with threaded portion 233 of shaft 232 in the assembly process to clamp the inner race of bearing 223 between nut 251 and the shoulder formed by enlargement 234 of shaft 232. At the same time shield 243, the outer periphery of which is dimensioned to freely but closely engage within flange 199 is guided into position within flange 199 the peripheral engagement being such as to assure running clearance between the shield and flange 236. To assure proper axial clearance between wheel 218 and the end face of member 224, vanes 217 and body 209, shims 252 may be inserted between bearing 223 and the end face of enlargement 234. It will of course, be understood that the free end of shaft 232 protrudes from section 211 and that pinion 228 and its bearing 227 are readily mountable thereon at this time.

The construction just described is effective to rigidly journal shaft 232 and its associated wheels 218 and 238 in bearing section 211 of body casting 186. The spaced bearings 223 and 227 effectively resist the tilting moment resulting from the overhanging weight of wheels 218 and 238 and assure true running of pinion 228 and the shaft and wheel assembly. Automatic lubrication of the shaft bearings may be accomplished in any desired manner but preferably is effected in well known manner by a pressure system through a pipe line 253 (Figures 1, 3 and 13) leading from oil pump 142 (Figure 3) supplied from the gear box oil reservoir. Pipe line 253 containing oil filter 254 connects pump 142 to a tapped passage (not shown) in body casting 186 in communicating with internal lubrication passages 255 (those to bearing 223 not being shown) leading to bearings 223 and 227. A suitable oil return duct 256 (Figures 2 and 13) returns the oil to the gear box reservoir in a matter that will be obvious from an inspection of the drawing.

From the description so far given, it will be appreciated that shield 243 has not yet been secured in place. The necessary securing is accomplished simultaneously with the assembly of the turbine nozzle vane assembly and scroll which will now be described.

Figure 9:
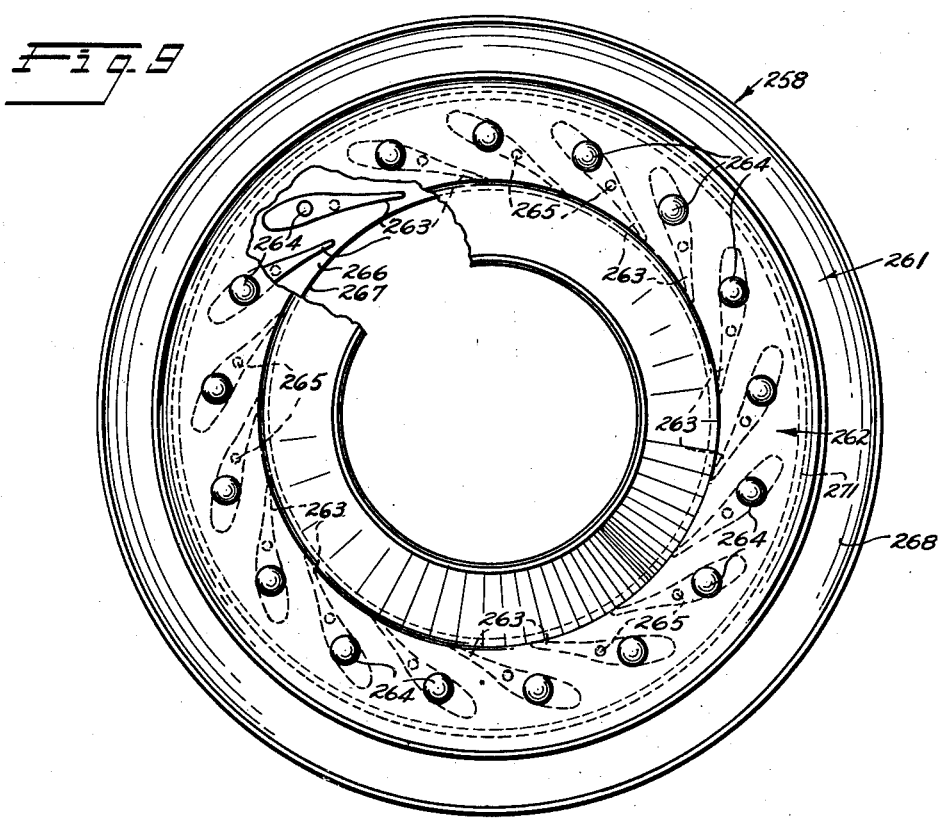
Figure 9 is a detailed elevational view, with certain parts broken away for clarity of illustration, of the novel nozzle vane assembly of this invention.

While any suitable form of turbine nozzle vane assembly and scroll may be utilized, the present invention contemplates a novel riveted nozzle vane assembly composed of fabricated forged nozzle vane structure 258 and sheet metal scroll structure 259. The novel nozzle vane structure will first be described in detail and for this purpose attention for the moment is directed particularly to Figures 9 and 10 of the drawings.

Nozzle vane assembly 258 is made up of a pair of generally dish-shaped ring elements 261 and 262 of substantially different configuration in cross-section, of different diameters, a plurality of suitably shaped vane members 263, suitable rivets 264 for securing the ring elements and vane members in assembled relation, and a plurality of positioning pins 265 adapted to fix the vane members against movement with respect to their respective securing rivets and the ring elements after predetermined assembly. As clearly seen from Figures 9 and 10, ring element 261 is the larger and provides a flat annular body portion 266 extending in a radial direction and providing a central opening 267 of a diameter to clear the periphery of the body of wheel 238. The outer edge of element 261 is formed by a smoothly curving portion 268 extending in a generally outward and axial direction from one face and terminating in a short axially extending annular rim 269. The other face of body portion 266 is provided with an axially extending annular flange 271 the inner face of which is of a diameter sufficiently large to freely telescopically receive flange 200 of compressor diffuser vane structure 191. The radial thickness of flange 271 is appreciably less than the radial spacing of flanges 200 and 202 as clearly shown in Figure 10. As a consequence, ring member 261 and flange 271 can freely expand relative to ring 193 when ring member 261 is exposed to the high temperatures of the combustion gases passing through the turbine.

Body portion 266 at angularly spaced intervals, corresponding in number to the number of vanes 263 to be used, is provided with through openings to receive rivets 264. Body portion 266 in angularly offset and radially inwardly spaced relation to each of the openings for rivets 264 is also provided with a smaller through opening to receive a positioning pin 265. Between them, rivets 264 and their respective positioning pins 265 determine the angular position of the nozzle vanes 263 which are each provided along the longitudinal axis with a through opening and a dead end opening to respectively receive the securing rivet 264 and positioning pin 265 individual to each vane. Any desired angular positioning of vanes 263 can be obtained by appropriate location of the respective rivet openings and positioning pin openings in body portion 266.

Ring element 262 has a flat annular body portion 272 similar to ring 261 but of shorter radial width and is provided with rivet openings aligned with the rivet openings of ring 261. The inner terminus of body portion 272 lies in alignment with the wall defining opening 267 while the outer terminus, in the illustrated embodiment, lies substantially in alignment with the inner face of flange 271 and leads into a curved portion 273 curving outwardly and axially in the same general direction as curved portion 268 of ring element 261. Curved portion 273 is generated around an axis different from curved portion 268 and has a substantially smaller radius, in the illustrated embodiment. The central portion of ring 262 slopes inwardly and away from ring 261 at the inner periphery of the body portion and curves forwardly to form an annular axially extending wall 274 defining an axially directed exhaust opening 275 for the spent combustion gases.

Ring element 262 is assembled on rivets 264 after the rivets have been passed through element 261 and the vanes 263. The axial spacing of rings 261 and 262 is determined by the axial dimension of vanes 263, the end faces of which lie in flush contact with the opposed faces of the rings. It will be appreciated that rings 261 and 262 and vanes 263 may be individually machined before assembly to assure proper contact surfaces and that any desired throat or passage opening between the ring body portions may be obtained by controlling the axial dimensions of the vanes. It will also be appreciated that the axially facing entrance opening may be readily designed to have any desired area relation to the throat passage by controlling the axial vane dimensions and the curvature and relative radial body dimensions of the rings. The present fabricated structure, therefore, provides an extremely simple and inexpensive nozzle vane assembly the elements of which can be readily varied to secure any desired flow characteristics.

It is to be understood that the elements of the nozzle vane assembly are assembled into nozzle vane unit 258 before association with diffuser 191. As a consequence, nozzle vane assembly 258 is mountable as a unit on diffuser flange 200. In order to secure nozzle vane assembly 258 in place and still permit free relative thermal expansion of assembly 258, the present invention provides a novel securing pin comprising a shank 276, provided at one end with an inwardly tapered lead nose 277 and at its other end with an enlarged, headed, threaded body portion 278. Body portion 278, as clearly seen in Figure 10, is threaded into a suitably tapped opening in diffuser flange 202 until head 279 engages the outer peripheral surface of flange 202. To permit such threading of the securing pin, flanges 200 and 271, in alignment with the tapped opening in flange 202, are provided with through openings to snugly receive shank 276. As will be clear from Figure 10, tapered nose 277 engages the outer enlarged rim of shield 243 as the securing pin is threaded home and forces shield 243 into tight seating engagement with the shoulder 281 of diffuser ring 193 which may, if desired, be machined to assure a true seating surface.

As clearly shown in Figure 10, the annular groove 282 in the outer rim of shield 243 is located fairly close to the face of the rim engaged by nose 277. As a result, the force of engagement of nose 277, after shield 243 is seated on shoulder 281 will crimp the thin metal portion of the rim contacted by nose 277 inwardly into groove 282 so that the securing pin not only secures shield 243 against axial displacement but also positively secures the shield against relative rotational movement with respect to diffuser ring 193 and nozzle vane assembly 258. It will be understood that a multiplicity of these securing pins spaced annularly around flanges 200, 202, and 271 are provided so that shield 243 is rigidly secured in place. It will also be apparent that nose 277 when passing through the aligned openings in flanges 200 and 271 will have a camming action tending to axially displace these rims relative to each other. Since flange 200 is of shorter axial length than flange 271, proper machinery of the end face of flange 271 and the abutting area of diffuser ring 193 can be effected to establish firm abutting engagement between the end face and diffuser ring 193. In this way, the axial relationship between diffuser ring 193 and nozzle vane assembly 258 can be established and maintained to assure proper running clearance with respect to turbine wheel 238.

The exhaust opening 275 of nozzle vane assembly 258 as shown in Figure 2, telescopically receives the end of a thin sheet metal exhaust duct 285 the opposite end of which is provided with an abutment flange 286 adapting the exhaust duct for connection to suitable flue ducting 287, if desired. Such flue ducting may be built into the ship structure to convey exhaust fumes from the hold compartments where the pump may be used or may be in the form of flexible piping connectable to duct 285 to convey the exhaust fumes away from the area surrounding the pump. In either case, a connecting means that can be quickly and easily operated is desired. For this purpose, the present invention contemplates that duct 287 have its end adjacent duct 285 provided with a mating abutment flange 288 and provides a sheet metal ring 289 of C-shaped cross-section split at one point in an axial direction and provided with radially directed securing flanges 291. Suitable nut and bolt assemblies 292 passing through flanges 291 are provided to draw ring 289 tightly around flanges 286 and 288 to clamp abutment flanges 286 and 288 in assembled relation.

The turbine scroll structure 259 is in part formed by the outer surface of nozzle vane assembly ring 262 and is completed by the ring-like sheet metal wall member 294 which, as seen clearly in Figure 10, is necked in at 295 to fit within the entrance end of ring 261. An annular weld seam 296 (Figure 10) permanently secures member 294 to ring 261. As clearly seen in Figure 2, member 294 has an extremely complicated configuration, with curved surfaces meeting from every angle, and includes the inlet connection 297 for connection to the combustion chamber 298 as will be presently described. Because of this complicated configuration and the fact that critical clearances and machining for cooperation with moving parts is not involved, scroll member 294 lends itself to hammer and press formation at minimum expense.

As clearly seen in Figure 2, the annular portion of wall member 294 extends inwardly in a generally radial direction and terminates in an axially directed annular lip 299 engaging the periphery of exhaust duct 285 substantially midway of its length. An annular weld seam 301 secures lip 299 to duct 285. As a result of weld seams 296 and 301, wall member 294 has leakproof connection with nozzle vane assembly 258 and exhaust duct 285 and combustion gas passing from the combustion chamber is prevented from escaping to the surrounding atmosphere. Member 294 is also necked down at 302 as it merges into inlet duct 297 so the incoming combustion gases will be forced to follow a generally clockwise path through the turbine scroll.

Combustion chamber 298 may take any suitable form so long as it does not increase the overall dimensions of the power-pump unit but preferably, as will be clear from Figures 1, 2 and 4, is of elbow-like configuration and quite short in length so as to be substantially nested in the angular space provided between turbine inlet duct 297 and the substantially right angularly disposed compressor outlet duct 303. This combustion chamber per se forms no part of the present invention but is the invention of one Grant B. Hodgson covered by United States Letters Patent 2,651,913 entitled Gas Turbine Combustion Chamber and dated September 15, 1953. Accordingly, the present description thereof will be very general and reference to the aforementioned application may be had for a more detailed disclosure.

So far as pertinent here, combustion chamber 298 comprises a main body portion 304 of generally cylindrical form necked-out at one end to receive turbine scroll inlet duct 297 and closed at its other end by a closure cap 305. Closure cap 305 at its center supports a fuel inlet nozzle 306 which in turn carries a concentrically arranged fuel and air mixing head 307 opening axially toward the turbine inlet. Substantially midway between its ends body portion 304 is provided with an air inlet duct 308 connected in suitable manner to compressor outlet duct 303. As clearly seen in Figure 2, mixing head 307 is made up of a centrally depressed, annular, dome-shaped, sheet metal section 309 welded to nozzle 306, a lower annular sheet metal section 310 the end of which, opposite section 309, is inclined inwardly at an angle of 50° to define a coaxial throat opening of a diameter slightly greater than the radius of main body portion 304, and a terminal, diverging, axially fluted skirt 311 inclined outwardly at an angle of 40°. Skirt 311, as more clearly illustrated in the above identified Hodgson application, is welded to an outwardly, flaring rim or flange member 312 welded to the inner end of section 310. The axially fluted skirt as a result of the inward depressions of the flutes forms together with member 312 circumferentially spaced, inwardly converging, air conducting passages 313 the outer ends of which open toward the wall of body portion 304.

Skirt 311 terminates, as seen from Figure 2, at approximately the medial plane of air-inlet duct 308 so as to intercept a portion of the air discharged from compressor outlet 303 separating the air into upper and lower layers of strata, respectively used as air for mixture with the fuel and combustion air. Since the air is normally discharged from outlet 303 at high velocity and the upper stratum is projected against annular section 310 and skirt 311, the portion of the upper stratum striking section 310 will be divided into two streams flowing in opposite directions around mixing section 310 and the lower portion of the upper stratum will flow directly into and through the flute passages 313 facing inlet duct 308 to the mixing chamber. The oppositely flowing streams, after encircling section 310, will collide with each other and the wall of body portion 304 creating a turbulently flowing body of air in the side of the combustion chamber opposite inlet 308. This turbulent body of air finds a ready escape path through the adjacent flute passages 313 into the mixing head 307. There it mixes with the remainder of the upper stratum, the path of flow being indicated by the arrows in Figure 2, and the divergent fuel spray in a manner fully described in the aforementioned Hodgson application to form a fuel mixture which is discharged in a generally axial direction through the mixing head throat opening. The lower stratum of air issuing from inlet duct 308 flows into the combustion chamber past the lower end of skirt 311 to intersect the discharged fuel mixture at substantially a right angle. A suitable igniter, such as a spark plug indicated by numeral 314 (Figures 1 and 3), connected by cable 315 to a magneto 316, preferably a Model XH–4 manufactured by Wisco Electric Co., of Springfield, Massachusetts, driven by a pinion 317, driven from starting crank mechanism 25 in a manner to be described, is provided to ignite the fuel mixture. Igniter 314 is mounted in the wall of body portion 304 and is so located with respect to the lower end of skirt 311 that the flame front of the ignited products of combustion will be established substantially along the plane of line 318 (Figure 2). It is to be understood that igniter 314 is energized only during starting since combustion once started is self-sustaining during normal operation of the power plant.

In order to protect personnel from the heat of the turbine and its exhaust duct, the present invention provides sheet metal shrouding 325 for enclosing the turbine scroll and exhaust duct 285. As clearly seen from Figures 2 and 4, shrouding 325 is made up of four complemental sections 326, 327, 328, and 329. Sections 328 and 329, in addition to housing the turbine scroll itself, has a generally half-tubular section 331 to receive the turbine inlet duct 297. Section 331 and the lower portion of the main body sections 328 and 329 are provided with outwardly directed peripherally extending, mating securing flanges 332, right angularly disposed end securing flanges 333, and upper medially extending mating securing flanges 334. Sections 326 and 327 also contain outwardly directed, peripherally extending, mating securing flanges 335, and right angularly disposed end securing flanges 336 adapted to matingly engage flanges 333 of sections 328 and 329. As clearly appears from Figure 2, sections 328 and 329 are necked in at 337 to clampingly engage the telescoping sections of turbine outlet 297 and combustion chamber body 304. Sections 326 and 329 are similarly necked in around exhaust duct 285 clampingly engage duct 285. As a consequence shroud 325 is supported by inlet and outlet ducts 285 and 297 in peripherally spaced relation to the turbine scroll structure and suitable openings 338, peripherally spaced around duct 285, are provided to establish communication between the intervening space and the interior of duct 285. Since the exhaust gases passing through duct 285 are moving at a relatively high velocity, a slight aspirating effect is created at each opening 338. This aspirating effect together with the air bleed passages 339 (Figure 10) connecting the interior of the compressor scroll to the interior of shroud 325 establishing a circulation of air through the open end 340 (Figures 2 and 10) of shroud 325, the space between the turbine scroll and shroud, and into exhaust duct 285 through openings 338. As a consequence, an efficient shielding of the ambient air from the highly heated turbine scroll and turbine exhaust duct is assured by the present invention. In addition to protecting the personnel and area surrounding the turbine section, this cooling air flow carries the turbine heat away from the compressor scroll and contiguous parts to prevent overheating thereof.

Further protection of the compressor from the turbine heat is afforded by shield 243 and the passages provided in the hub of turbine wheel 238 and flange 235, and shoulder 236 of shaft 232 previously described. In this connection, shield 243 intercepts the heat radiated from the body of turbine wheel 238 and the face of shield 243 opposite compressor wheel 218 is washed by a slight flow of air from the high pressure side of compressor wheel 218 passing through the clearance passage between the compressor wheel and the central opening in diffuser ring 193 and past the labyrinth seal formed by the inner enlarged rim of shield 243 into and through the aforesaid passages. It should be noted that no appreciable volume of air is involved in this flow circuit. However, a substantial flow of air is not required at this point to effectively protect the compressor parts since the principal protection is afforded by creating a relatively high pressure in the space between compressor wheel 218 and shield 243 to block leakage of hot combustion gases past the labyrinth seal. The slight flow of air resulting is sufficient, however, to maintain the temperature of shield 243 at a reasonably low relative temperature to prevent undesired overheating of the compressor wheel, shaft 232, and the shaft bearings 223 and 227.

*The starting mechanism*

While starting of the power pump unit may be effected in any desired manner, the intended usage of this device contemplates manual cranking due to use of the device at points where starting power is not readily available. To this end, the drive for starting mechanism 25, consisting of crank shaft 47, crank arms 48, crank handles 49, sprocket wheel 53, sprocket wheel 182 and the one way clutch connecting sprocket wheel 182 to take-off shaft 124 previously described, is completed by a large diameter 32-tooth sprocket wheel 345 (Figure 3) and a small diameter 10-tooth wheel 346 (Figure 3) mounted on a stub shaft 347 journalled in boss 144 and respectively connected to sprocket wheels 182 and 53 by suitable drive chains 348 and 349. This chain drive is effective, upon manual operation of crank shaft 47 through crank arms 48 and crank handles 49 in a clockwise direction as shown by the arrow in Figure 2, to rotate take-off shaft 124 at approximately ⅛ of the normal operating speed, gear 123 and pinion 228 having a 1 to 9 ratio to step up the speed of the turbine shaft 232 and wheels 218 and 238 to the necessary approximately 500 R. P. M. as determined by tachometer 351 (Figures 1 and 11) on control and instrument panel 172. To more readily attain this speed with less effort on the part of the operator or operators, use is made of a novel compressor-turbine unloader valve 352 (Figure 2) mounted in compressor outlet duct 303 and manually operable through an externally mounted valve handle 353. This valve forms no part of the present invention but is the sole invention of Arsham D. Zakarian and is disclosed and claimed in United States Letters Patent 2,651,910, owned by the assignee of the present invention, entitled Turbine Starting Mechanism and dated September 15, 1953. Reference may be had to the aforesaid copending application for a complete and detailed disclosure of this valve. For the purposes of this application, it need only be pointed out that when valve 352 is turned to its closed position communication between the compressor and combustion chamber is cut off so the compressor wheel 218 moves in still air and the turbine wheel 238, throttle valve 160 being also closed, is not supplied with either air or fuel mixture from combustion chamber and will also move in still air. As a consequence, neither the compressor nor turbine wheel does any appreciable work and offer little or no resistance to cranking. With the outlets from pump impeller 150 also closed, the pump impeller also will do no work and will offer no appreciable resistance to cranking of the unit. As a consequence, it will be appreciated that the turbine elements may very readily and easily be brought up to the 500 R. P. M. starting speed when using this unloader valve.

This normal clockwise rotation of the cranking mechanism, through driving engagement of sprocket wheel 317 with the outer face of the upper run of chain 349, drives the rotor of magneto 316 (clockwise as viewed from the sprocket wheel end) conveniently energizing igniter 314. However, explosion does not occur during the initial cranking operation since valves 160 and 352 are closed and combustible mixture is not being introduced into the combustion chamber.

Actual starting is effected, valves 160 and 352, elbow primer 77, pump outlet valve actuators 109 and 110, and ejector primer 115 all being in closed position and the pump hoses being positioned as desired, by manual operation of cranks 49 or either of them in the normal cranking direction. Such cranking is continued until tachometer 351 reads 5000 R. P. M. Starting tests have established that a turbine speed of 6100 R. P. M. can be obtained in 12 seconds with two persons cranking the unit under the conditions just described. It will be appreciated, therefore, that the desired 5000 R. P. M. starting speed can be readily obtained in an extremely short time.

When the desired starting speed is attained, throttle 160 is opened about one turn of the hand wheel. As magneto 316 is energized, igniter 314 produces a spark to ignite the incoming fuel. This combustion registers on the temperature indicator 361 connected to the turbine exhaust and signals the operator to open valve 352. Normal cranking is continued to aid operation due to the combustion and the fuel flow is adjusted to keep the temperature within starting range until the tachometer reading reaches 10,000 to 11,000 R. P. M. At this point the turbine operation becomes self-sustaining and hand cranking may be discontinued. Throttle 160 is then slowly opened until normal turbine speed, about 40,300 R. P. M., is reached. About two additional turns of the throttle handwheel is usually sufficient for this purpose and the power plant, through governor 154 and overspeed shut-off valve 138, will automatically maintain its normal rated speed. Suitable pump discharge pressure indicator 362, oil pressure indicator 363 and fuel pressure indicator 364 are provided on panel 172 to quickly locate trouble if the unit should fail in operation.

With the power plant operating in this manner, pump unit 22 is placed in operation, preferably through actuation of ejector primer 115, the sole operation necessary being depression of assembly 120 to open the valves of primer 115. Usually 45 seconds is sufficient to secure operation of pump unit 12 after actuation of primer 115. If desired or necessary, bucket primer 77 may be used instead of ejector primer 115. In either case, pumping operations are readily and quickly effected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power pump unit comprising a skeleton support frame; a pump unit mounted on said frame within the confines of the frame and at one end corner thereof and having inlet and outlet connections adjacent said corner and a pump shaft; and a compact light weight, high horsepower, single stage turbo-compressor power unit mounted within the confines of said frame and at the other end thereof and having a compressor rotor and a turbine rotor disposed in longitudinal back-to-back alignment along the side intersecting said corner, a combustion chamber having inlet and outlet connections occupying the corner diagonally opposite said one corner at the side of said turbo-compressor power unit and a power take-off shaft drivingly connected to said pump shaft whereby said pump may be closely coupled to and driven by said power unit and said pump unit and said power unit together form a compact self-contained power pump unit of minimum width and length capable of manual portage from place to place for use at any desired point of operation.

2. The combination defined in claim 1 wherein said turbo-compressor power unit is disposed in spaced relation to said pump shaft and comprises a center inlet, radial flow compressor having its inlet in surrounding relation to said end of said power take-off shaft and a side outlet; a side inlet, radial flow turbine having its outlet in coaxial relation to said power take-off shaft; and a combustion chamber of substantially elbow configuration mounted on said turbine and having its opposite ends respectively connected to said compressor outlet and to said turbine inlet.

3. The combination defined in claim 1 wherein said skeleton frame comprises respective upper and lower rectangularly shaped tubular frame members; a plurality of widely spaced, substantially straight, vertically extending, tubular frame elements rigidly connected at their respective ends to said upper and lower rectangularly shaped frame members; and mounting ears rigidly connected to said frame members and elements at predetermined points mounting said pump unit and said power unit.

4. The combination defined in claim 3 wherein the upper frame member at points along the upper opposite side frame members between the pump unit end and the power unit end is provided with opposed, aligned, depending bearing ears and a starting crankshaft, having a crank handle, is journalled in said ears and drivingly connected to the power unit.

5. The combination defined in claim 4 wherein said crankshaft and said power unit are drivingly connected through said pump shaft and a one way chain and sprocket drive interposed between said pump shaft and said crankshaft.

6. In a power-pump unit comprising a rotary pump unit having a drive shaft and a driving gear secured to said shaft between its ends: a turbo-compressor power unit comprising a main power take-off shaft disposed at right angles to said drive shaft; a power take-off pinion secured to one end of said power take-off shaft and meshingly engaging said driving gear to define a close couple between said power unit and said pump unit; a combined radial flow compressor-turbine rotor, composed of compressor and turbine wheels mounted in close coupled back to back relation on said power take-off shaft; a compressor scroll structure disposed in coaxial surrounding relation to said power take-off shaft and said compressor wheel and having a radially extending clamping face disposed in the plane of and in radially spaced relation to the abutting faces of said wheels; a turbine scroll structure disposed in coaxial relation to said power take-off shaft with its inlet portion in surrounding relation to the turbine wheel and having a mating radially extending clamping face abuttingly engaging the clamping face of said compressor scroll structure; and means for securing said scroll structures in assembled back-to-back relation, defining a compact lightweight manually portable power unit.

7. The combination defined in claim 6 wherein the compressor scroll structure comprises an inlet conduit coaxially disposed with respect to the power take-off shaft and extending axially toward the pump unit where it terminates in a radially directed mounting flange removably connected to said pump unit, provides an internal, axially extending, centrally disposed bore freely receiving said power take-off shaft and a power take-off shaft bearing support structure.

8. The combination defined in claim 6 wherein the compressor scroll structure comprises an inlet conduit coaxially disposed with respect to the power take-off shaft and extending axially toward the pump unit, and terminating at the pump end of said power take-off shaft in an annularly arranged, side opening, air inlet passage.

9. A compact light weight single stage compressor turbine power plant structure comprising an axial inlet compressor scroll and an axial outlet turbine scroll mounted in back to back relation, a compressor turbine rotor assembly journalled for rotation within said scrolls and comprising radial flow back to back compressor and turbine wheels disposed within said compressor and turbine scrolls respectively, said turbine scroll having an inlet conduit section the axis of which is normal to a plane containing the axis of said rotor assembly, said conduit section being tangential to said turbine scroll, a combustion chamber coaxial with said turbine scroll conduit, said compressor scroll having an outlet conduit section the axis of which intersects the axis of said combustion chamber and opens into the side of said combustion chamber whereby one end of said combustion chamber is unobstructed by said conduit sections to permit access to said combustion chamber through said free end for maintenance purposes.

10. In combination with a turbo-compressor power plant having a compressor-turbine power shaft: a manual starting mechanism comprising a driven shaft; a driving couple including speed increasing gear means between said power shaft and said driven shaft adapting said driven shaft to drive said power shaft at high speed for starting; a manually operable crankshaft; means drivingly connecting said manually operable crankshaft with said driven shaft, including a one-way overrunning clutch adapting said manually operable crankshaft and said last mentioned connecting means for reverse rotation or non-rotation with respect to said driven and power shafts.

11. The combination defined by claim 10, wherein the driving connections between the manually operable shaft and the driven shaft comprise means for driving said driven shaft at higher speed then said manually operable shaft.

12. The combination defined by claim 10, wherein said driving couple between the power and driven shafts comprises gearing operable to increase the speed of the power shaft relative to the driven shaft and to drive said driven shaft from the power shaft at reduced speed in the normal operation of said turbine.

13. The combination defined by claim 10, wherein the driving connections between the manually operable shaft and driven shaft comprise means for driving said driven shaft at higher speed than said manually operable shaft and said driving couple between the power and driven shafts comprises gearing operable to increase the speed of the power shaft relative to the driven shaft and to drive said driven shaft from the power shaft at reduced speed in the normal operation of said turbine.

14. In combination with a portable compact lightweight single stage turbo-compressor power plant having a power shaft and a primary driven unit having a driven shaft: a gear box and driving gearing therefor comprising a housing having an opening for journalling one end of said driven shaft and a second opening at right angles to said one opening for receiving an end of said power shaft; a drive pinion secured to said end of said power shaft; a driven gear secured to said driven shaft and meshingly engaging said drive pinion whereby said power plant and primary driven unit are compactly closely coupled; auxiliary driven equipment; a plurality of countershafts journalled in said housing and having coupling ends accessible from the exterior of said housing for selectively connecting said respective countershafts to said auxiliary driven equipment; and driving connections between each of said countershafts and said driven shaft whereby said power shaft selectively drives both said primary driven unit and said auxiliary driven equipment.

15. The combination defined in claim 14 together with a skeleton supporting frame work adapted to mount said turbo-compressor power plant, driven unit, and gear box and driving gearing for unitary handling.

16. The combination defined in claim 15 together with a manually operable crankshaft supported in said framework in juxtaposition to said power plant, fuel tanks in superposed relation to said turbo-compressor power plant, driving means drivingly connecting said crankshaft to said driven shaft and additional means operatively connecting said fuel tanks to said power plant.

17. The combination of claim 16 wherein said driving means comprises a first sprocket wheel secured to said crankshaft, a second sprocket wheel secured to said driven shaft, and a speed increasing sprocket chain and sprocket wheel system interposed between and operatively connecting said first and second sprocket wheels.

18. The combination defined in claim 16 wherein said additional means comprises normal and maximum speed control means comprising a fuel pump drivingly connected to one of said countershafts, a fuel line connecting said fuel tanks and said fuel pump and containing an overspeed shut-off valve drivingly connected to another of said countershafts, and a fuel line connecting said fuel pump and said turbo-compressor power plant and containing a speed governing valve drivingly connected to said fuel pump.

19. In a turbo-compressor power plant a compressor housing and air diffuser comprising a main generally tubular housing portion having an axial bore, a coaxial, substantially annular, air inlet passage having a side opening inlet end, and axially spaced terminal mounting flange formations at its opposite ends, the flange formation at one end comprising a peripheral shoulder and an axially offset, radially extending, support flange of substantially greater diameter than said shoulder; and a generally annularly shaped air diffuser comprising a first annulus having a central bore of a diameter equal to the diameter of said shoulder disposed in snug encircling relation to said shoulder, and an annular boss on one radial face providing a clamping surface for abuttingly engaging the outwardly facing radial face of said support flange, a second annulus disposed in axially spaced relation to said first annulus and having a central bore, a compressor wheel body mounted in said bore with a running clearance between said bore and the periphery of the compressor wheel and an axially extending flange at the outer edge of said second annulus and a peripherally and radially extending flange interrupting the peripheral surface of said flange to provide oppositely facing peripherally extending clamp seats, and a plurality of peripherally spaced vanes extending between and secured along their respective opposite edges to said first and second annulus and curving in the direction of rotation of said compressor to direct the discharged air along a generally annular trajectory from said diffuser.

20. In a turbo compressor power plant having a compressor housing providing a peripherally disposed mounting flange, a compressor scroll of generally annular configuration having a tangentially arranged outlet conduit and a pair of axially spaced inwardly directed flange formations one of which is annularly recessed at its inner edge to receive said peripheral flange of said compressor housing and the other of which extends radially inwardly to provide a wall defining a coaxial opening matingly engaging another portion of said compressor housing axially spaced from said peripheral flange and lying radially outwardly beyond the inner edge of said one flange formation of said compressor scroll and having on its face remote from said one flange an annular formation of generally C-shaped configuration in cross section forming an axially opening annular recess adapting said compressor scroll for supporting in back-to-back mating relation a suitably designed portion of a turbine scroll structure.

21. The combination defined in claim 20 wherein said compressor housing mounting flange is located adjacent one end of said housing and provides a radially extending support flange seated in the annular recess of said one scroll flange formation and an axially offset peripheral shoulder supporting an annular air diffuser the wall of which remote from said peripheral shoulder terminates at its outer edge in a peripheral flange having an annular recess at one side to receive the inner peripheral margin of said other scroll flange formation and at its other side carries said opening defining flanges the innermost one of which is disposed in radially inwardly spaced relation sufficient to provide said axially opening recess with a radial dimension sufficient to freely receive said portion of said turbine scroll structure.

22. The combination defined in claim 21 wherein the outer one of said axially extending flanges of said compressor housing is provided with annularly spaced, radially extending tapped openings and said other of said axially extending annular mounting flanges is provided with annularly spaced, radially extending openings in alignment with but of lesser diameter than said tapped openings, and, said outer one of said flanges threadedly receives headed scroll connecting pins having threaded bodies adjacent the heads and terminal shanks extending inwardly of said tapped openings and protruding through said annular recess and closely fitting said openings in said other of said flanges to thereby secure said portion of said turbine scroll in assembled relation against relative axial movement while permitting relative radial thermal expansion of said turbine scroll.

23. The combination defined in claim 22 together with a radiation shield of annular ring-like configuration disposed within said inner one of said axially extending annular flanges in close proximity to the radial wall of said air diffuser and having peripherally extending radially outwardly diverging rim flanges lying in close proximity to said inner one of said flanges and tapered extremities on said securing pins cooperating with the exposed rim flange of said radiation shield to engage said exposed rim flange and thereby secure said shield in rigid assembled relation to said air diffuser.

24. The combination defined in claim 23 wherein the inner edge of said radiation shield is of enlarged cross-sectional area and its inner peripheral wall is annularly grooved and of such a diameter that it cooperates with a portion of said turbo-compressor power plant rotor assembly to provide a labyrinth seal substantially eliminating fluid communication between the areas at either side of said shield to thereby protect the compressor parts from the high temperature combustion products operating in the turbine.

25. A single stage, compact, lightweight, turbo-compressor power plant of minimum length and cross sectional dimensions comprising a radial flow compressor having a centrally disposed axial shaft housing, a surrounding axial air inlet, a radially extending, centrally hubbed rotor body, an air diffuser peripherally encircling the rotor body and having vanes for directing the air stream from the rotor in a generally peripheral path and a radially spaced pair of axially and annularly extending mounting flanges on the turbine side, an annular, centrally open compressor scroll surrounding and communicating with said air diffuser and having a turbine side in the form of a radially extending abutment face and a tangentially arranged outlet conduit the exit end of which is axially offset slightly in the direction of the turbine; a radial flow turbine having axial outlet, a radially extending, centrally hubbed, rotor body mounted with its central hub in back-to-back close coupled relation to the compressor rotor hub, a radially directed, combined nozzle vane and turbine scroll section peripherally encircling the turbine rotor and having vanes for directing the turbine drive gas angularly against the turbine rotor, an axially and annularly extending mounting flange on the compressor side disposed and secured against axial movement in the annular space between said mounting flanges of said air diffuser and a turbine scroll inlet section including a tangentially arranged inlet conduit peripherally offset from said compressor outlet conduit; a radiation shield supported by said air diffuser and extending inwardly between said compressor and turbine rotor bodies into fluid sealing cooperation with said compressor and turbine rotor hubs and protecting the compressor rotor body, compressor air diffuser and compressor scroll and parts from the radiated heat from said turbine and turbine rotor; a combustion chamber having right angularly related inlet and outlet connections mounted through its outlet connection on said turbine inlet conduit and a foreshortened body length disposing its inlet connection opposite said compressor outlet conduit whereby the combustion chamber is substantially nested within the transverse dimensions of said compressor and turbine scrolls in the angular space provided by the annular offset relation of said compressor outlet and turbine inlet conduits, means connecting said combustion chamber inlet connection to said compressor outlet connection; and a combined compressor rotor shaft and turbine rotor shaft journalled in said shaft housing with one end connected to said compressor rotor and said turbine rotor and its opposite end extending beyond the inlet end of said radial flow compressor.

26. In a turbo-compressor power plant a turbine nozzle vane structure comprising a first annulus having an annular generally radially extending portion providing annularly spaced axially extending openings therein; a second annulus having a generally radially extending portion providing annularly spaced axially extending openings therein aligned with said openings of said first annulus; flow directing vanes, each having a transverse through bore, disposed between said first annulus and said second annulus with said bore axially aligned with respective openings in said annuluses; a rivet extending through the bore of each of said vanes and respective aligned bores and openings for securing each of said vanes in place and said first annulus and said second annulus in assembled relation to said vanes, and means associated with each of said vanes and one of said annuluses for angularly locating the vanes with respect to the axis of said annuluses.

27. The combination of claim 26 wherein said last mentioned means comprises a recess along one side edge of said vanes and at least one of said annuluses in predetermined offset angular relation to each of said through openings is provided with an axially protruding element engaged in the recess in its respective vane to predetermine and maintain a preselected angularity of said vanes to the axis of said annuluses.

28. The combination of claim 26 wherein said first annulus has an axially and outwardly curving rim terminating in an axially directed marginal lip, and said second annulus is of slightly smaller outer diameter and has an axially and outwardly curving rim having similar directional characteristics but of smaller curvature than that of said first annulus terminating in an axially directed marginal lip disposed in radially inwardly spaced axially inwardly offset relation to the lip of said first annulus whereby said rims define an annular, axially opening, curving inlet passage leading to said flow directing vanes.

29. The combination defined in claim 28 together with an annular, axially extending mounting flange protruding from the face of said first annulus opposite that engaged by said vanes mounting said nozzle vane structure on a portion of the compressor of said turbo-compressor power plant.

30. The combination defined in claim 29 together with a sheet metal scroll-like member having an annular lip welded to the marginal lip of said first annulus and a scroll-like body providing a centrally disposed circular opening coaxially disposed with respect to the axis of said nozzle vane structure and a tangentially directed cylindrical duct portion in fluid communication with the interior of said scroll-like body.

31. A combined compressor housing and turbine housing assembly comprising a generally cylindrical compressor inlet body having mounting flanges at its respective opposite ends and an annular air passage extending axially thereof and merging at one end into a peripherally directed inlet opening; an annular diffuser structure mounted on the mounting flange at the end remote from said inlet opening and having a radial wall face remote from said compressor inlet, a pair of radially spaced axially extending annular mounting flanges protruding from said wall face and a central opening coaxially disposed with respect to said annular air passage in said compressor inlet body; an annular nozzle vane structure having oppositely disposed radial wall faces one of which is remote from said diffuser structure, an axially directed, annular inlet opening near its periphery in the face remote from said diffuser structure and a centrally disposed opening coaxially disposed with respect to said central opening of said diffuser structure and an axially directed annular mounting flange protruding from its other face and located to be freely received within the outermost annular mounting flange of said diffuser structure; an annular radiation shield disposed within the inner annular mounting flange of said diffuser structure and having a central opening coaxially disposed with respect to said central openings in said diffuser structure and said nozzle vane structure; and means extending through said annular mounting flanges of said diffuser structure and said nozzle vane structure and secured in the outer of said annular diffuser mounting flanges securing said diffuser structure and said nozzle vane structure against relative axial movement and said radiation shield against movement relative to said diffuser structure while permitting free relative radial expansion of said nozzle vane structure with respect to said diffuser structure.

32. The combination defined in claim 31 together with a compressor outlet scroll mounted on the end mounting flange of said compressor inlet body on which the diffuser structure is mounted in encircling relation to said diffuser structure and having a tangentially disposed, angularly directed outlet duct extending across and beyond said nozzle vane structure, and a combustion chamber mounted on an end of said angularly directed duct.

33. The combination defined in claim 32 together with a turbine exhaust duct disposed in the portion of the central opening of said nozzle vane structure remote from said diffuser structure and a sheet metal, turbine scroll wall member having an open face the inner and outer edges of which are respectively welded to the peripheral wall of said nozzle vane inlet opening and said exhaust duct and a tangentially disposed, cylindrical duct portion in fluid communication with the interior of said wall and forming a turbine inlet duct connected to said combustion chamber.

34. The combination defined in claim 33 wherein said compressor outlet duct and said turbine inlet duct are arranged in right angular relation to one another and said combustion chamber is disposed in the angular space delimited by the free ends of said ducts.

35. A manually portable power pump unit useable in hazardous locations from a fire standpoint comprising a pump unit; a compact light weight, low grade hydrocarbon fuel burning power unit comprising a single stage radial flow compressor rotor, a single stage radial flow turbine rotor mounted in back to back relation to said compressor rotor, a compressor turbine housing assembly embodying a combustion chamber interposed in fluid communication between the compressor and turbine and disposed in tangential relation to said rotor, means operatively connecting said power unit to drive said pump unit; and skeleton frame means mounting said pump unit and power unit for movement as a unit, said low grade hydrocarbon fuel burning power pump unit due to the low volatility of the fuel consumed assuring a unit of negligible explosive tendencies.

References Cited in the file of this patent

UNITED STATES PATENTS

| | | |
|---|---|---|
| 1,497,081 | Wait | June 10, 1924 |
| 1,610,454 | Lawaczeck | Dec. 14, 1926 |
| 1,718,768 | Wait | June 25, 1929 |
| 1,819,485 | Sedlmeir | Aug. 18, 1931 |
| 1,931,692 | Good | Oct. 24, 1933 |
| 2,262,195 | Noack | Nov. 11, 1941 |
| 2,283,176 | Birman | May 19, 1942 |
| 2,330,498 | Lee et al. | Sept. 28, 1943 |
| 2,360,777 | La Bour | Oct. 17, 1944 |
| 2,390,959 | Pfenninger | Dec. 11, 1945 |
| 2,414,551 | Pavlecka et al. | Jan. 21, 1947 |
| 2,470,184 | Pfenninger | May 17, 1949 |
| 2,476,179 | Cameron | July 12, 1949 |
| 2,494,821 | Lombard | Jan. 17, 1950 |
| 2,508,685 | Peterson | May 23, 1950 |
| 2,511,432 | Feilden | June 13, 1950 |
| 2,531,411 | Davenport | Nov. 28, 1950 |
| 2,547,660 | Prince | Apr. 3, 1951 |
| 2,589,239 | Fallon | Mar. 18, 1952 |

FOREIGN PATENTS

| | | |
|---|---|---|
| 85,993 | Austria | Oct. 25, 1921 |
| 262,066 | Switzerland | Sept. 16, 1949 |
| 335,500 | Great Britain | Sept. 25, 1930 |
| 568,047 | France | Dec. 15, 1923 |
| 644,159 | Germany | Apr. 26, 1937 |